United States Patent
Tokiwa

(10) Patent No.: US 7,636,285 B2
(45) Date of Patent: Dec. 22, 2009

(54) METHOD AND APPARATUS FOR INSPECTING OPTICAL DISC

(75) Inventor: Kazunori Tokiwa, Tokyo-to (JP)

(73) Assignee: Victor Company of Japan, Ltd., Yokohama (JP)

( * ) Notice: Subject to any disclaimer, the term of this patent is extended or adjusted under 35 U.S.C. 154(b) by 601 days.

(21) Appl. No.: 11/594,183

(22) Filed: Nov. 8, 2006

(65) Prior Publication Data

US 2007/0127339 A1 Jun. 7, 2007

(30) Foreign Application Priority Data

| Dec. 6, 2005 | (JP) | ............................. 2005-351636 |
| Jan. 11, 2006 | (JP) | ............................. 2006-003750 |
| Apr. 21, 2006 | (JP) | ............................. 2006-117663 |

(51) Int. Cl.
*G11B 7/00* (2006.01)

(52) U.S. Cl. ................................. 369/53.22; 369/44.41

(58) Field of Classification Search ........................ None
See application file for complete search history.

(56) References Cited

U.S. PATENT DOCUMENTS 7,400,565 B2 * 7/2008 Sasaki ..................... 369/53.24
2006/0098546 A1 * 5/2006 Ogawa et al. ............ 369/53.35
2009/0092026 A1 * 4/2009 Watanabe et al. ........... 369/100

FOREIGN PATENT DOCUMENTS

| JP | 10-293926 | 11/1998 |
| JP | 11-203692 | 7/1999 |

* cited by examiner

*Primary Examiner*—Joseph H Feild
*Assistant Examiner*—Joseph Haley
(74) *Attorney, Agent, or Firm*—Louis Woo

(57) ABSTRACT

Reflected light caused by reflection of a laser beam at a first layer of an optical disc is converted into a main signal. Reflected light caused by reflection of the laser beam at a second layer of the optical disc is converted into a sub signal. An address of a currently-accessed position in the first layer is detected from the main signal. A reference address in the first layer corresponds to a boundary between a signal recorded area and a signal unrecorded area in the second layer. A specified address in the first layer corresponds to a position radially separated from the position at the reference address by an allowable range. A misalignment between tracks on the first and second layers is concluded to be within the allowable range in cases where the sub signal substantially takes a reference level when the detected address reaches the specified address.

22 Claims, 10 Drawing Sheets

METHOD AND APPARATUS FOR INSPECTING OPTICAL DISC

BACKGROUND OF THE INVENTION

1. Field of the Invention

This invention generally relates to a method and an apparatus for inspecting an optical disc. This invention particularly relates to a method and an apparatus for checking whether the difference between track positions, which should align with each other, on respective adjacent recording layers of a multi-layer optical disc is within a prescribed allowable error range.

2. Description of the Related Art

There is a prior-art method of inspecting a DVD-R having two recording layers. The prior-art method utilizes a microscope. The details of an essential part of the prior-art method are as follows.

The two recording layers of a DVD-R are called the "0" layer and the "1" layer, respectively. Signal recording with a prescribed track width is performed on each of the "0" layer and the "1" layer. As a result, there occurs a signal recorded area and a signal unrecorded area or areas in each of the "0" layer and the "1" layer. Three points on the circumferential boundary between the signal recorded area and the signal unrecorded area in the "0" layer are two-dimensionally observed by using a microscope. The track center position and the track diameter concerning the "0" layer are determined from the three observed points. Specifically, first and second points among the three observed points are connected by a first straight line segment, and the remaining point and one of the first and second points among the three observed points are connected by a second straight line segment. A first perpendicular bisector of the first straight line segment is constructed. A second perpendicular bisector of the second straight line segment is constructed. The point of the intersection of the first and second perpendicular bisectors is the track center position concerning the "0" layer. Doubling the distance between the track center position and one of the three observed points equals the track diameter concerning the "0" layer. Similarly, the track center position and the track diameter concerning the "1" layer are determined. The distance between the track center position concerning the "0" layer and that concerning the "1" layer is a center deviation quantity (a center error quantity or an eccentricity) Rd whose adverse effect appears when the optical disc rotates.

A maximum relative error value Dmax and a minimum relative error value Dmin are prescribed as error-related requirements for the manufacture of an optical disc. In the case where the start address in the "0" layer is FFCFFFh in hexadecimal notation, a track position on the "1" layer which should align or radially coincide with the position at the start address in the "0" layer is at an address of 003000h plus an Ax value of 0.258 mm. The Ax value is a prescribed radial track difference between the "0" layer and the "1" layer. Regarding the manufacture of an optical disc, an allowable error range for the above-indicated track position on the "1" layer is between +0.168 mm and +0.348 mm in terms of the Ax value (+0.258 mm).

The maximum relative error value Dmax and the minimum relative error value Dmin are calculated from the center deviation quantity Rd according to the following equations.

$$D\max=(D_{L0}-D_{L1})/2+Rd$$

$$D\min=(D_{L0}-D_{L1})/2-Rd$$

where $D_{L0}$ denotes the track diameter concerning the "0" layer, and $D_{L1}$ denotes the track diameter concerning the "1" layer. The maximum relative error value Dmax and the minimum relative error value Dmin are required to satisfy specified error-range conditions of a "1" layer track position relative to an ECC block address in the "0" layer track. It should be noted that the address (003000h) of the track position on the "1" layer which corresponds to the start address (FFCFFFh) in the "0" layer is obtained through the bit inversion of the start address. The track position on the "1" layer which should align or radially coincide with the position at the start address (FFCFFFh) in the "0" layer results from radially outwardly shifting the position at the start address by a distance equal to the Ax value.

Japanese patent application publication number 11-203692/1999 discloses an optical head including a semiconductor laser, a main photodetector, a defect sensing photodetector, a collimator lens, an objective lens, and a mirror. Main portions of a laser beam emitted from the semiconductor laser are focused into spots on an optical disc through the collimator lens and the objective lens. The main photodetector receives reflected laser light from the optical disc which originates from the main portions of the laser beam. The main photodetector converts the received laser light into a reproduced signal, a focusing error signal, and a tracking error signal. Tracking control of the laser beam with respect to the optical disc is implemented in response to the tracking error signal. The laser beam emitted from the semiconductor laser has a defect detecting portion traveling along a path outside the field of view of the collimator lens. The mirror directs the defect detecting portion of the laser beam to the optical disc. The defect detecting portion of the laser beam is focused on a position in the optical disc which precedes the spots of the main portions of the laser beam as viewed in a direction of rotation of the optical disc. The defect sensing photodetector receives reflected laser light from the optical disc which originates from the defect detecting portion of the laser beam. The defect sensing photodetector converts the received laser light into a corresponding electric signal. The level of the electric signal is monitored. A defect in the optical disc is detected from a variation in the monitored level of the electric signal. In the case where a defect in the optical disc is detected, the tracking control is suspended for a prescribed time interval while the objective lens remains fixed. Accordingly, the defect in the optical disc is prevented from causing a tracking offset which would disturb a tracking servomechanism.

Japanese patent application publication number 10-293926/1998 discloses a DVD-R which has a land track formed with pre-pits representing on-disc address information called LPP (land pre-pit) address information. Before the recording of information data on the DVD-R, the LPP address information is detected therefrom. During the recording of information data, the currently-accessed position on the DVD-R is controlled according to the detected LPP address information.

It is known that a DVD-RW having multiple recording layers is formed with land pre-pits (LPP) representing on-disc address information.

SUMMARY OF THE INVENTION

It is a first object of this invention to provide a reliable apparatus for inspecting an optical disc having multiple recording layers.

It is a second object of this invention to provide a reliable method of inspecting an optical disc having multiple recording layers.

A first aspect of this invention provides an apparatus for inspecting an optical disc having multiple recording layers including first and second recording layers adjacent to each other. The second recording layer has a signal recorded area and a signal unrecorded area. A boundary between the signal recorded area and the signal unrecorded area is at a prescribed address on a track on the second recording layer. The apparatus comprises an optical pickup for applying a main laser beam to the optical disc, for focusing the main laser beam on one of the multiple recording layers, and for receiving reflected light caused by reflection of the main laser beam at the one of the multiple recording layers to reproduce a recorded signal from the one of the multiple recording layers; a first photodetector provided in the optical pickup for receiving a main reflected beam caused by reflection of the main laser beam at the one of the multiple recording layers; a second photodetector provided in the optical pickup and separated from the first photodetector; first means for detecting a level of a signal generated by the second photodetector in response to reflected light caused by reflection of the main laser beam at the second recording layer and incident to the second photodetector when the optical pickup reproduces a recorded signal from the first recording layer; second means for detecting an address of a currently-accessed position in a track on the first recording layer from a signal generated by the first photodetector in response to reflected light caused by reflection of the main laser beam at the first recording layer and incident to the first photodetector when the optical pickup reproduces a recorded signal from the first recording layer; third means for obtaining a reference address in the first recording layer, the reference address corresponding to a position radially coincident with a position at the prescribed address in the second recording layer; fourth means for calculating an allowable error limit address in the first recording layer from the reference address, the allowable error limit address corresponding to a position radially separated from the position at the reference address by a distance determined by an allowable error range; fifth means for detecting that the address detected by the second means reaches the allowable error limit address when the optical pickup reproduces a recorded signal from the first recording layer; sixth means for deciding whether or not the level detected by the first means is substantially equal to a reference level when the fifth means detects that the address detected by the second means reaches the allowable error limit address, the reference level being equal to a detected level obtained by the first means when the sub photodetector receives reflected light caused by reflection of the main laser beam at the signal recorded area in the second recording layer; and seventh means for concluding that a misalignment between the tracks on the first and second recording layers is within the allowable error range in cases where the sixth means decides that the level detected by the first means is substantially equal to the reference level.

A second aspect of this invention is based on the first aspect thereof, and provides an apparatus wherein the second recording layer is closer to the optical pickup than the first recording layer is when the optical pickup reproduces a recorded signal from the first recording layer, and the first means comprises means for detecting a level of a signal generated by the second photodetector in response to flare caused by reflection of the main laser beam at the second recording layer and incident to the second photodetector.

A third aspect of this invention is based on the first aspect thereof, and provides an apparatus wherein the first recording layer is closer to the optical pickup than the second recording layer is when the optical pickup reproduces a recorded signal from the first recording layer, and the first means comprises means for detecting a level of a signal generated by the second photodetector in response to flare caused by reflection of the main laser beam at the second recording layer and incident to the second photodetector.

A fourth aspect of this invention is based on the first aspect thereof, and provides an apparatus wherein the first means comprises means for detecting one of (1) a peak level and (2) a mean level of a signal generated by the second photodetector.

A fifth aspect of this invention provides a method of inspecting an optical disc having multiple recording layers including first and second recording layers adjacent to each other. The second recording layer has a signal recorded area and a signal unrecorded area. A boundary between the signal recorded area and the signal unrecorded area is at a prescribed address on a track on the second recording layer. The method comprises the steps of applying a main laser beam to the optical disc, focusing the main laser beam on the first recording layer, receiving reflected light caused by reflection of the main laser beam at the first recording layer, and converting the received reflected light into a main electric signal to reproduce a recorded signal from the first recording layer; receiving reflected light caused by reflection of the main laser beam at the second recording layer, and converting the received reflected light into a sub electric signal; detecting a level of the sub electric signal; detecting an address of a currently-accessed position in a track on the first recording layer from the main electric signal; obtaining a reference address in the first recording layer, the reference address corresponding to a position radially coincident with a position at the prescribed address in the second recording layer; calculating an allowable error limit address in the first recording layer from the reference address, the allowable error limit address corresponding to a position radially separated from the position at the reference address by a distance determined by an allowable error range; detecting that the detected address reaches the allowable error limit address when a recorded signal is reproduced from the first recording layer; deciding whether or not the detected level is substantially equal to a reference level when the detected address reaches the allowable error limit address, the reference level being equal to a detected level obtained in response to reflected light caused by reflection of the main laser beam at the signal recorded area in the second recording layer; and concluding that a misalignment between the tracks on the first and second recording layers is within the allowable error range in cases where the detected level is substantially equal to the reference level when the detected address reaches the allowable error limit address.

A sixth aspect of this invention is based on the fifth aspect thereof, and provides a method wherein the second recording layer is closer to an optical disc surface to which the main laser beam is incident than the first recording layer is, and the level detecting step comprises detecting a level of the sub electric signal generated in response to flare caused by reflection of the main laser beam at the second recording layer.

A seventh aspect of this invention is based on the fifth aspect thereof, and provides a method wherein the first recording layer is closer to an optical disc surface to which the main laser beam is incident than the second recording layer is, and the level detecting step comprises detecting a level of the sub electric signal generated in response to flare caused by reflection of the main laser beam at the second recording layer.

An eighth aspect of this invention is based on the fifth aspect thereof, and provides a method wherein the level detecting step comprises detecting one of (1) a peak level and (2) a mean level of the sub electric signal.

A ninth aspect of this invention provides an apparatus for inspecting an optical disc having multiple recording layers including first and second recording layers adjacent to each other. The second recording layer has a signal recorded area and first and second signal unrecorded areas. The signal recorded area extends between the first and second signal unrecorded areas. A boundary between the signal recorded area and the first signal unrecorded area is at a prescribed recording start address on a track on the second recording layer, and a boundary between the signal recorded area and the second signal unrecorded area is at a prescribed recording end address on the track on the second recording layer. The apparatus comprises an optical pickup for applying a main laser beam to the optical disc, for focusing the main laser beam on one of the multiple recording layers, and for receiving reflected light caused by reflection of the main laser beam at the one of the multiple recording layers to reproduce a recorded signal from the one of the multiple recording layers; a first photodetector provided in the optical pickup for receiving a main reflected beam caused by reflection of the main laser beam at the one of the multiple recording layers; a second photodetector provided in the optical pickup and separated from the first photodetector; first means for detecting a level of a signal generated by the second photodetector in response to reflected light caused by reflection of the main laser beam at the second recording layer and incident to the second photodetector when the optical pickup reproduces a recorded signal from the first recording layer; second means for detecting an address of a currently-accessed position in a track on the first recording layer from a signal generated by the first photodetector in response to reflected light caused by reflection of the main laser beam at the first recording layer and incident to the first photodetector when the optical pickup reproduces a recorded signal from the first recording layer; third means for obtaining first and second reference addresses in the first recording layer, the first reference address corresponding to a position radially coincident with a position at the prescribed recording start address in the second recording layer, the second reference address corresponding to a position radially coincident with a position at the prescribed recording end address in the second recording layer; fourth means for calculating first and second allowable error limit addresses in the first recording layer from the first and second reference addresses, the first allowable error limit address corresponding to a position radially separated from the position at the first reference address by a distance determined by an allowable error range, the second allowable error limit address corresponding to a position radially separated from the position at the second reference address by a distance determined by the allowable error range; fifth means for detecting that the address detected by the second means reaches the first allowable error limit address when the optical pickup reproduces a recorded signal from the first recording layer, and for detecting that the address detected by the second means reaches the second allowable error limit address when the optical pickup reproduces a recorded signal from the first recording layer; sixth means for deciding whether or not the level detected by the first means is substantially equal to a reference level when the fifth means detects that the address detected by the second means reaches the first allowable error limit address, and for deciding whether or not the level detected by the first means is substantially equal to the reference level when the fifth means detects that the address detected by the second means reaches the second allowable error limit address, the reference level being equal to a detected level obtained by the first means when the sub photodetector receives reflected light caused by reflection of the main laser beam at the signal recorded area in the second recording layer; and seventh means for concluding that a misalignment between the tracks on the first and second recording layers is within the allowable error range in cases where the sixth means decides that the level detected by the first means is substantially equal to the reference level when the fifth means detects that the address detected by the second means reaches the first allowable error limit address, and decides that the level detected by the first means is substantially equal to the reference level when the fifth means detects that the address detected by the second means reaches the second allowable error limit address.

A tenth aspect of this invention is based on the ninth aspect thereof, and provides an apparatus wherein the second recording layer is closer to the optical pickup than the first recording layer is when the optical pickup reproduces a recorded signal from the first recording layer, and the first means comprises means for detecting a level of a signal generated by the second photodetector in response to flare caused by reflection of the main laser beam at the second recording layer and incident to the second photodetector.

An eleventh aspect of this invention is based on the ninth aspect thereof, and provides an apparatus wherein the first recording layer is closer to the optical pickup than the second recording layer is when the optical pickup reproduces a recorded signal from the first recording layer, and the first means comprises means for detecting a level of a signal generated by the second photodetector in response to flare caused by reflection of the main laser beam at the second recording layer and incident to the second photodetector.

A twelfth aspect of this invention is based on the ninth aspect thereof, and provides an apparatus wherein the first means comprises means for detecting one of (1) a peak level and (2) a mean level of a signal generated by the second photodetector.

A thirteenth aspect of this invention provides a method of inspecting an optical disc having multiple recording layers including first and second recording layers adjacent to each other. The second recording layer has a signal recorded area and first and second signal unrecorded areas. The signal recorded area extends between the first and second signal unrecorded areas. A boundary between the signal recorded area and the first signal unrecorded area is at a prescribed recording start address on a track on the second recording layer, and a boundary between the signal recorded area and the second signal unrecorded area is at a prescribed recording end address on the track on the second recording layer. The method comprises the steps of applying a main laser beam to the optical disc, focusing the main laser beam on the first recording layer, receiving reflected light caused by reflection of the main laser beam at the first recording layer, and converting the received reflected light into a main electric signal to reproduce a recorded signal from the first recording layer; receiving reflected light caused by reflection of the main laser beam at the second recording layer, and converting the received reflected light into a sub electric signal; detecting a level of the sub electric signal; detecting an address of a currently-accessed position in a track on the first recording layer from the main electric signal; obtaining first and second reference addresses in the first recording layer, the first reference address corresponding to a position radially coincident with a position at the prescribed recording start address in the second recording layer, the second reference address corresponding to a position radially coincident with a position at the prescribed recording end address in the second recording layer; calculating first and second allowable error limit addresses in the first recording layer from the first and second reference addresses, the first allowable error limit address corresponding to a position radially separated from the position at the first reference address by a distance determined by an allowable error range, the second allowable error limit address corresponding to a position radially separated from the position at the second reference address by a distance determined by the allowable error range; detecting that the detected address reaches the first allowable error limit address when a recorded signal is reproduced from the first recording layer, and detecting that the detected address reaches the second allowable error limit address when a recorded signal is reproduced from the first recording layer; deciding whether or not the detected level is substantially equal to a reference level when the detected address reaches the first allowable error limit address, and deciding whether or not the detected level is substantially equal to the reference level when the detected address reaches the second allowable error limit address, the reference level being equal to a detected level obtained in response to reflected light caused by reflection of the main laser beam at the signal recorded area in the second recording layer; and concluding that a misalignment between the tracks on the first and second recording layers is within the allowable error range in cases where the detected level is substantially equal to the reference level when the detected address reaches the first allowable error limit address, and the detected level is substantially equal to the reference level when the detected address reaches the second allowable error limit address.

A fourteenth aspect of this invention is based on the thirteenth aspect thereof, and provides a method wherein the second recording layer is closer to an optical disc surface to which the main laser beam is incident than the first recording layer is, and the level detecting step comprises detecting a level of the sub electric signal generated in response to flare caused by reflection of the main laser beam at the second recording layer.

A fifteenth aspect of this invention is based on the thirteenth aspect thereof, and provides a method wherein the first recording layer is closer to an optical disc surface to which the main laser beam is incident than the second recording layer is, and the level detecting step comprises detecting a level of the sub electric signal generated in response to flare caused by reflection of the main laser beam at the second recording layer.

A sixteenth aspect of this invention is based on thirteenth aspect thereof, and provides a method wherein the level detecting step comprises detecting one of (1) a peak level and (2) a mean level of the sub electric signal.

A seventeenth aspect of this invention provides an apparatus for inspecting an optical disc having multiple recording layers including first and second recording layers adjacent to each other. The second recording layer has a signal recorded area and first and second signal unrecorded areas. The signal recorded area extends between the first and second signal unrecorded areas. A boundary between the signal recorded area and the first signal unrecorded area is at a prescribed recording start address on a track on the second recording layer, and a boundary between the signal recorded area and the second signal unrecorded area is at a prescribed recording end address on the track on the second recording layer. The apparatus comprises an optical pickup for applying a main laser beam to the optical disc, for focusing the main laser beam on one of the multiple recording layers, and for receiving reflected light caused by reflection of the main laser beam at the one of the multiple recording layers to reproduce a recorded signal from the one of the multiple recording layers; a first photodetector provided in the optical pickup for receiving a main reflected beam caused by reflection of the main laser beam at the one of the multiple recording layers; a second photodetector provided in the optical pickup and separated from the first photodetector; first means for detecting a level of a signal generated by the second photodetector in response to reflected light caused by reflection of the main laser beam at the second recording layer and incident to the second photodetector when the optical pickup reproduces a recorded signal from the first recording layer; second means for detecting an address of a currently-accessed position in a track on the first recording layer from a signal generated by the first photodetector in response to reflected light caused by reflection of the main laser beam at the first recording layer and incident to the first photodetector when the optical pickup reproduces a recorded signal from the first recording layer; third means for obtaining a reference address in the first recording layer, the reference address corresponding to a position radially coincident with a position at the prescribed recording start address in the second recording layer; fourth means for calculating an allowable error limit address in the first recording layer from the reference address, the allowable error limit address corresponding to a position radially separated from the position at the reference address by a distance determined by an allowable error range; fifth means for detecting that the address detected by the second means reaches the allowable error limit address when the optical pickup reproduces a recorded signal from the first recording layer; sixth means for deciding whether or not the level detected by the first means is substantially equal to a reference level when the fifth means detects that the address detected by the second means reaches the allowable error limit address, the reference level being equal to a detected level obtained by the first means when the sub photodetector receives reflected light caused by reflection of the main laser beam at the signal recorded area in the second recording layer; and seventh means for concluding that a misalignment between the tracks on the first and second recording layers is within the allowable error range in cases where the sixth means decides that the level detected by the first means is substantially equal to the reference level when the fifth means detects that the address detected by the second means reaches the allowable error limit address.

An eighteenth aspect of this invention provides an apparatus for inspecting an optical disc having multiple recording layers including first and second recording layers adjacent to each other. The second recording layer has a signal recorded area and first and second signal unrecorded areas. The signal recorded area extends between the first and second signal unrecorded areas. A boundary between the signal recorded area and the first signal unrecorded area is at a prescribed recording start address on a track on the second recording layer, and a boundary between the signal recorded area and the second signal unrecorded area is at a prescribed recording end address on the track on the second recording layer. The apparatus comprises an optical pickup for applying a main laser beam to the optical disc, for focusing the main laser beam on one of the multiple recording layers, and for receiving reflected light caused by reflection of the main laser beam at the one of the multiple recording layers to reproduce a recorded signal from the one of the multiple recording layers; a first photodetector provided in the optical pickup for receiving a main reflected beam caused by reflection of the main laser beam at the one of the multiple recording layers; a second photodetector provided in the optical pickup and separated from the first photodetector; first means for detecting a level of a signal generated by the second photodetector in response to reflected light caused by reflection of the main laser beam at the second recording layer and incident to the second photodetector when the optical pickup reproduces a recorded signal from the first recording layer; second means for detecting an address of a currently-accessed position in a track on the first recording layer from a signal generated by the first photodetector in response to reflected light caused by reflection of the main laser beam at the first recording layer and incident to the first photodetector when the optical pickup reproduces a recorded signal from the first recording layer; third means for obtaining a reference address in the first recording layer, the reference address corresponding to a position radially coincident with a position at the prescribed recording end address in the second recording layer; fourth means for calculating an allowable error limit address in the first recording layer from the reference address, the allowable error limit address corresponding to a position radially separated from the position at the reference address by a distance determined by an allowable error range; fifth means for detecting that the address detected by the second means reaches the allowable error limit address when the optical pickup reproduces a recorded signal from the first recording layer; sixth means for deciding whether or not the level detected by the first means is substantially equal to a reference level when the fifth means detects that the address detected by the second means reaches the allowable error limit address, the reference level being equal to a detected level obtained by the first means when the sub photodetector receives reflected light caused by reflection of the main laser beam at the signal recorded area in the second recording layer; and seventh means for concluding that a misalignment between the tracks on the first and second recording layers is within the allowable error range in cases where the sixth means decides that the level detected by the first means is substantially equal to the reference level when the fifth means detects that the address detected by the second means reaches the allowable error limit address.

A nineteenth aspect of this invention is based on the seventeenth aspect thereof, and provides an apparatus wherein the first means comprises means for detecting one of (1) a peak level and (2) a mean level of a signal generated by the second photodetector.

A twentieth aspect of this invention provides a method of inspecting an optical disc having multiple recording layers including first and second recording layers adjacent to each other. The second recording layer has a signal recorded area and first and second signal unrecorded areas. The signal recorded area extends between the first and second signal unrecorded areas. A boundary between the signal recorded area and the first signal unrecorded area is at a prescribed recording start address on a track on the second recording layer, and a boundary between the signal recorded area and the second signal unrecorded area is at a prescribed recording end address on the track on the second recording layer. The method comprises the steps of applying a main laser beam to the optical disc, focusing the main laser beam on the first recording layer, receiving reflected light caused by reflection of the main laser beam at the first recording layer, and converting the received reflected light into a main electric signal to reproduce a recorded signal from the first recording layer; receiving reflected light caused by reflection of the main laser beam at the second recording layer, and converting the received reflected light into a sub electric signal; detecting a level of the sub electric signal; detecting an address of a currently-accessed position in a track on the first recording layer from the main electric signal; obtaining a reference address in the first recording layer, the reference address corresponding to a position radially coincident with a position at the prescribed recording start address in the second recording layer; calculating an allowable error limit address in the first recording layer from the reference address, the allowable error limit address corresponding to a position radially separated from the position at the reference address by a distance determined by an allowable error range; detecting that the detected address reaches the allowable error limit address when a recorded signal is reproduced from the first recording layer; deciding whether or not the detected level is substantially equal to a reference level when the detected address reaches the allowable error limit address, the reference level being equal to a detected level obtained in response to reflected light caused by reflection of the main laser beam at the signal recorded area in the second recording layer; and concluding that a misalignment between the tracks on the first and second recording layers is within the allowable error range in cases where the detected level is substantially equal to the reference level when the detected address reaches the allowable error limit address.

A twenty-first aspect of this invention provides a method of inspecting an optical disc having multiple recording layers including first and second recording layers adjacent to each other. The second recording layer has a signal recorded area and first and second signal unrecorded areas. The signal recorded area extends between the first and second signal unrecorded areas. A boundary between the signal recorded area and the first signal unrecorded area is at a prescribed recording start address on a track on the second recording layer, and a boundary between the signal recorded area and the second signal unrecorded area is at a prescribed recording end address on the track on the second recording layer. The method comprises the steps of applying a main laser beam to the optical disc, focusing the main laser beam on the first recording layer, receiving reflected light caused by reflection of the main laser beam at the first recording layer, and converting the received reflected light into a main electric signal to reproduce a recorded signal from the first recording layer; receiving reflected light caused by reflection of the main laser beam at the second recording layer, and converting the received reflected light into a sub electric signal; detecting a level of the sub electric signal; detecting an address of a currently-accessed position in a track on the first recording layer from the main electric signal; obtaining a reference address in the first recording layer, the reference address corresponding to a position radially coincident with a position at the prescribed recording end address in the second recording layer; calculating an allowable error limit address in the first recording layer from the reference address, the allowable error limit address corresponding to a position radially separated from the position at the reference address by a distance determined by an allowable error range; detecting that the detected address reaches the allowable error limit address when a recorded signal is reproduced from the first recording layer; deciding whether or not the detected level is substantially equal to a reference level when the detected address reaches the allowable error limit address, the reference level being equal to a detected level obtained in response to reflected light caused by reflection of the main laser beam at the signal recorded area in the second recording layer; and concluding that a misalignment between the tracks on the first and second recording layers is within the allowable error range in cases where the detected level is substantially equal to the reference level when the detected address reaches the allowable error limit address.

A twenty-second aspect of this invention is based on the twentieth aspect thereof, and provides a method wherein the level detecting step comprises detecting one of (1) a peak level and (2) a mean level of the sub electric signal.

This invention has the following advantages. It is possible to check whether an address error between track portions in "0" and "1" recording layers of a two-layer DVD-RW or a two-layer DVD-R which should align or radially coincide with each other is within an allowable range prescribed by the standards.

The check of the address error uses an inspection-purpose signal recorded area which is in an inner part, an intermediate part, or an outer part of one of recording layers in an optical disc. Therefore, regarding an inner part, an intermediate part, or an outer part of the optical disc, it is possible to check whether the address error is within the allowable range.

The check of the address error is responsive to the result of a decision as to a detected peak voltage or a detected mean voltage of an electric signal generated in response to received reflected light. The detected peak voltage exhibits a steep variation. Accordingly, the decision as to the detected peak voltage is easy. The detected mean voltage is hardly affected by noises in the electric signal. Therefore, the check of the address error in response to the detected mean voltage is reliable against noises in the electric signal.

DETAILED DESCRIPTION OF THE INVENTION

The prior-art method will be briefly explained for a better understanding of this invention.

Figure 1:
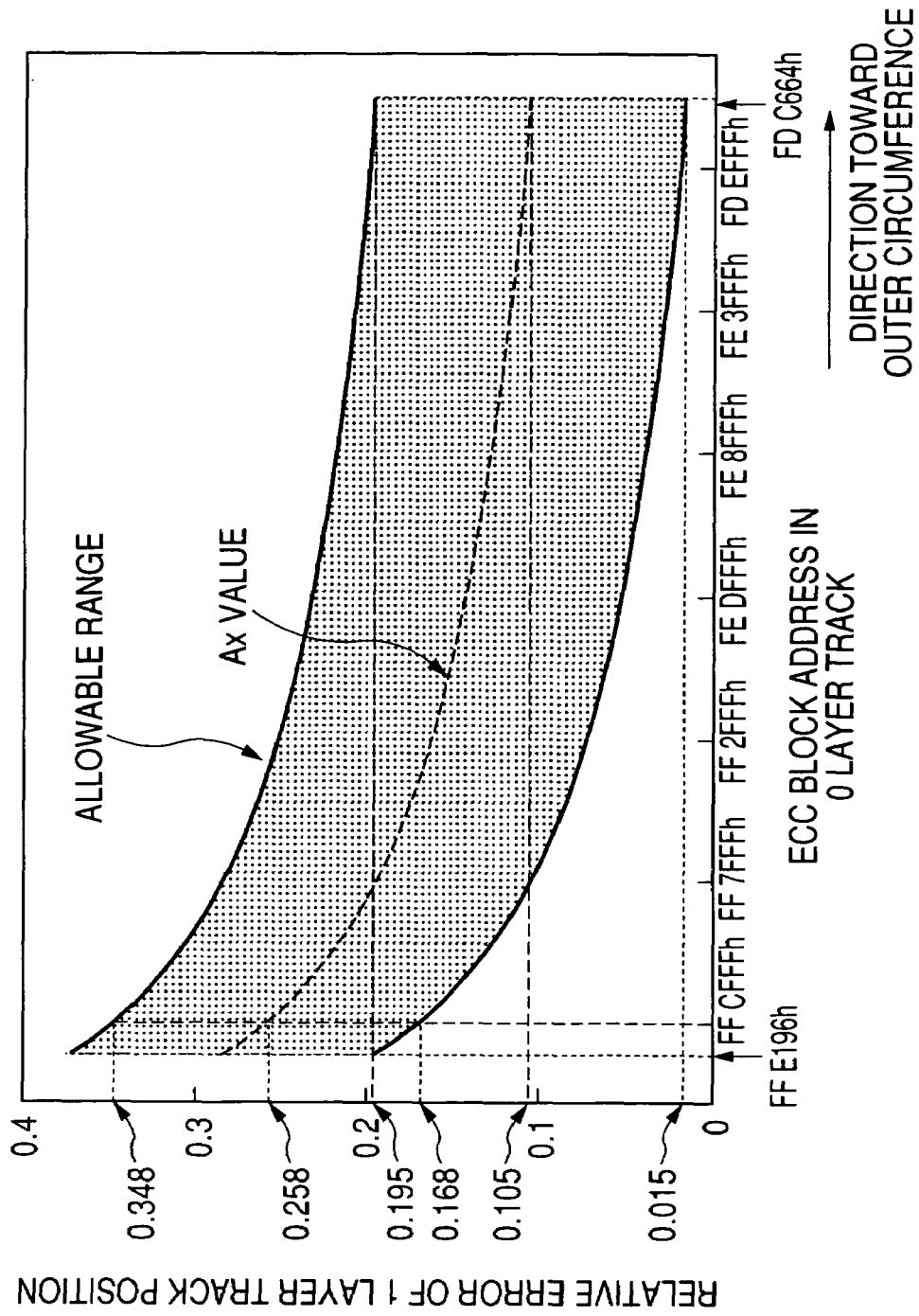
FIG. 1 is a diagram of an allowable error range of a track position in a recording layer of an optical disc relative to an ECC block address in another recording layer thereof which neighbors the former recording layer.

As previously mentioned, in the prior-art method, the maximum relative error value Dmax and the minimum relative error value Dmin are calculated. The maximum relative error value Dmax and the minimum relative error value Dmin are required to define a shaded area in FIG. 1 which indicates an allowable error range of a "1" layer track position relative to an ECC block address in the "0" layer track.

Basic Embodiment

A basic embodiment of this invention relates to a method of inspecting a DVD-R having two recording layers. The method includes a step of reproducing a signal from the DVD-R, and a step of measuring a condition of the reproduced signal to inspect the DVD-R. The details of an essential part of the method are as follows.

An HF signal is recorded on a DVD-R before being reproduced therefrom. The asymmetry of the reproduced HF signal is measured. A specified address position in the DVD-R is detected in response to a variation in the measured asymmetry. Specifically, a recording start address and a recording end address are predetermined. Signal recording with a prescribed track width is performed on an area in the "0" layer of the DVD-R between the recording start address and the recording end address. As a result, there occur a signal recorded area and a signal unrecorded area or areas in the "0" layer. Thereafter, signal recording is performed on an area in the "1" layer of the DVD-R which covers the signal recorded area in the "0" layer. Since the signal recording on the "1" layer is implemented by a laser beam which has passed through the "0" layer, the writing power of the laser beam reaching the "1" layer varies depending on whether the laser-beam-illuminated portion of the "0" layer is in the signal recorded area or the signal unrecorded area. Thus, during the scanning of the "1" layer, the writing power of the laser beam reaching the "1" layer varies in accordance with a boundary between the signal recorded area and the signal unrecorded area in the "0" layer. The writing power variation causes an asymmetry difference in an HF signal recorded on the "1" layer. The HF signal is reproduced from the "1" layer while the asymmetry of the reproduced HF signal is measured. During the scanning of the "1" layer, a specified on-disc position in the "1" layer which aligns with the position in the "0" layer at the recording start address or the recording end address is detected from a variation in the measured asymmetry of the reproduced HF signal. The reproduced HF signal is demodulated to detect an address of the currently-accessed position in the "1" layer. Thus, the address of the specified on-disc position in the "1" layer is detected. A desired address of the specified on-disc position in the "1" layer is calculated from the recording start address or the recording end address. The difference between the detected address and the desired address of the specified on-disc position indicates a positional error between tracks on the "0" layer and the "1" layer.

When the method in the basic embodiment of this invention is applied to a DVD-RW having two recording layers, a variation in the measured asymmetry of a reproduced HF signal is hardly detected. Therefore, the method is useless to the DVD-RW.

First Specific Embodiment

Figure 2:
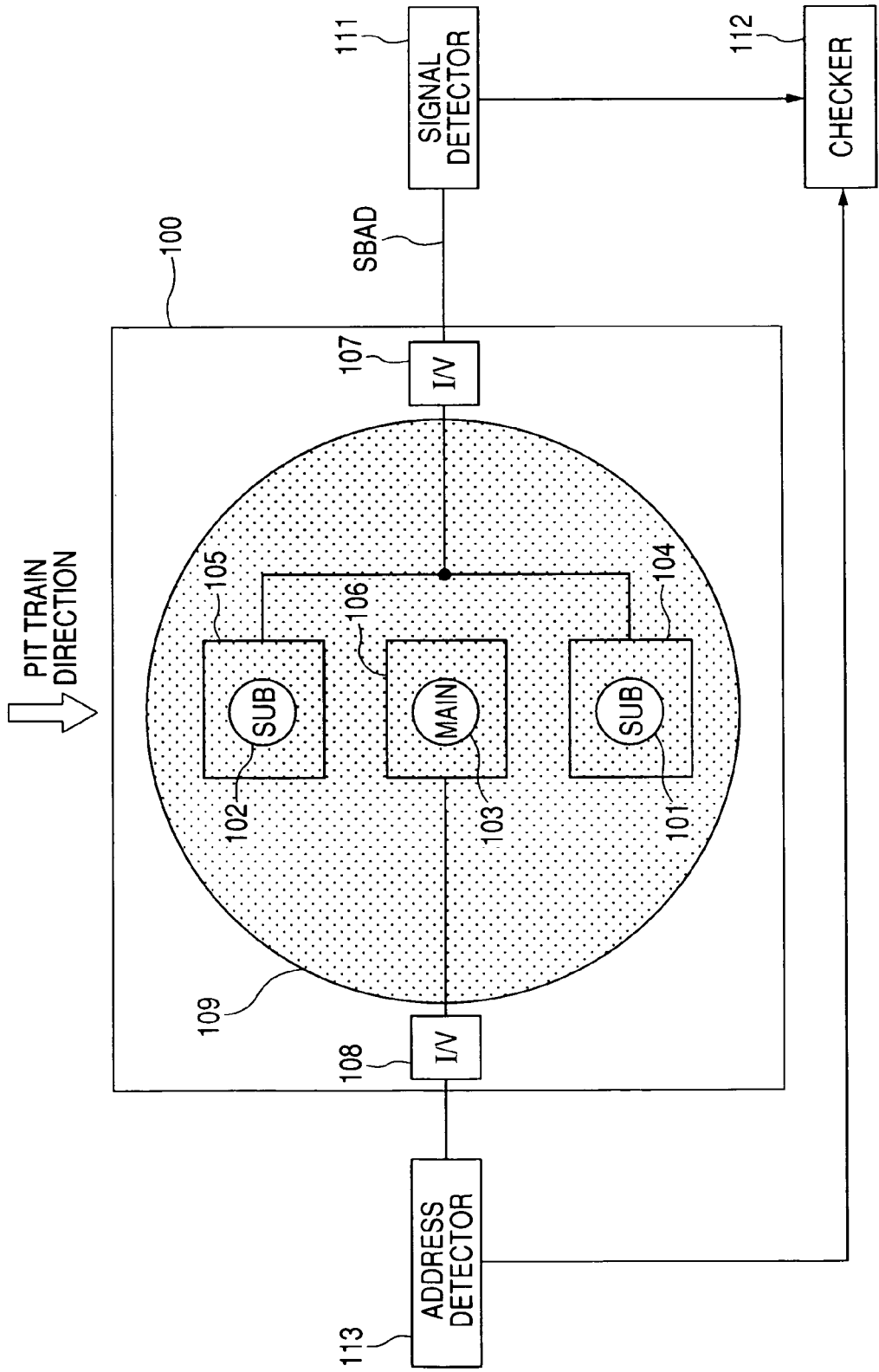
FIG. 2 is a diagram of a portion of an optical-disc inspection apparatus according to a first specific embodiment of this invention.

FIG. 2 shows a portion of an optical-disc inspection apparatus according to a first specific embodiment of this invention. The apparatus in FIG. 2 operates to inspect a recordable or rewritable optical disc having multiple recording layers. The optical disc is, for example, a DVD-RW having two recording layers or a DVD-R having two recording layers. The optical disc can be inserted into and ejected from the body of the apparatus.

Figure 3:
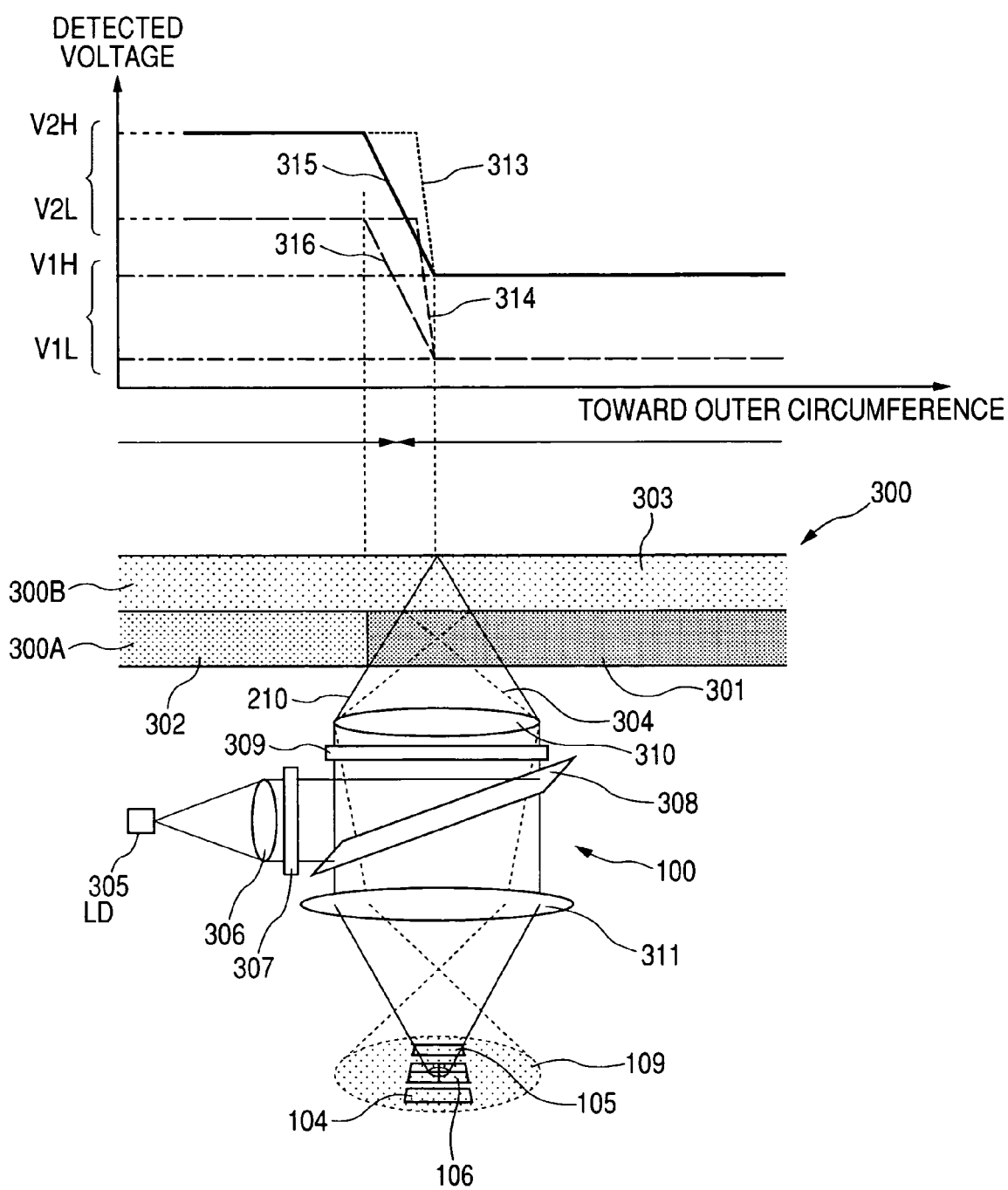
FIG. 3 is a diagram of an optical pickup, an optical disc, and a detected voltage obtained by a signal detector in FIG. 2.

As shown in FIG. 3, the optical disc 300 has a laminate of a "0" recording layer 300A and a "1" recording layer 300B. When the optical disc 300 is placed in position within the body of the apparatus in FIG. 2, the "0" recording layer 300A is closer to an optical pickup 100 of the apparatus than the "1" recording layer 300B is.

The optical pickup 100 applies a main laser beam and two sub laser beams to the optical disc 300. The optical pickup 100 focuses the main laser beam and the sub laser beams into respective spots on either the "0" recording layer or the "1" recording layer of the optical disc 300. During the recording and reproduction of information (a signal) on and from the optical disc 300, the optical disc 300 is rotated by a spindle motor (not shown) within the apparatus while being scanned by the main and sub laser beams from the optical pickup 100.

Figure 4:
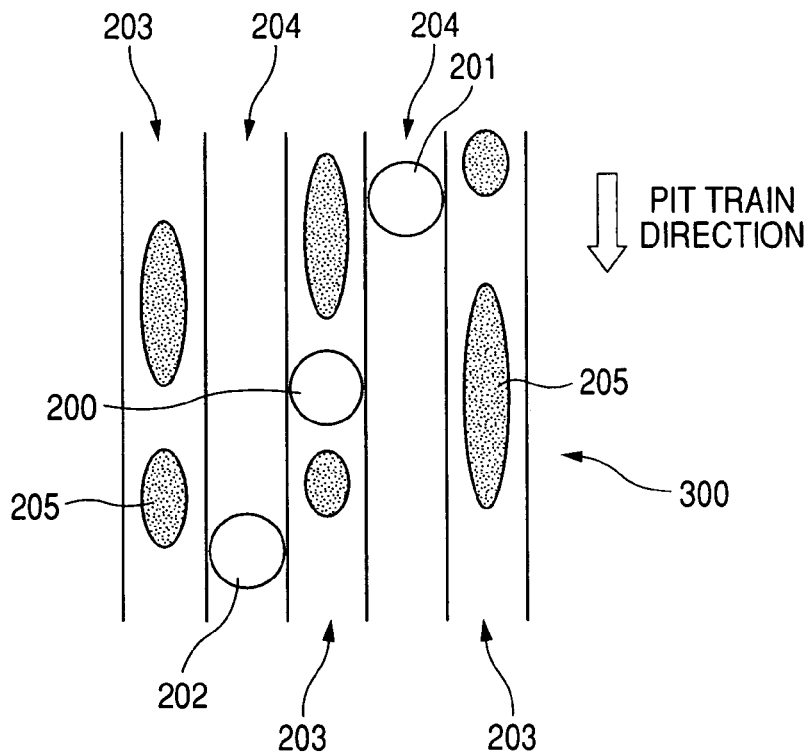
FIG. 4 is a plan view of a recorded area in a "0" recording layer of the optical disc.

FIG. 4 shows a condition of a signal recorded area in the "0" recording layer of the optical disc 300. In FIG. 4, the optical pickup 100 focuses the main laser beam into a spot 200 on a track groove 203 in the "0" recording layer of the optical disc 300, and focuses the sub laser beams into spots 201 and 201 on track lands 204 in the "0" recording layer between which the foregoing track groove 203 extends. There are recorded marks 205 in the track grooves 203.

With reference to FIG. 2, the optical pickup 100 includes two sub photodetectors 104 and 105 and a main photodetector 106. In FIG. 2, the optical pickup 100 focuses the main laser beam and the sub laser beams into respective spots on the "1" recording layer of the optical disc 300. The main laser beam and the sub laser beams are reflected by the optical disc 300 before returning to the optical pickup 100. The sub photodetectors 104 and 105 receive reflected laser beams 101 and 102 originating from the sub laser beams, respectively. The main photodetector 106 receives a reflected laser beam 103 originating from the main laser beam.

In FIG. 2, a circular zone in the optical pickup 100 which covers the sub photodetectors 104 and 105 and the main photodetector 106 is exposed to flare 109 caused by the reflection of the main laser beam at the "0" recording layer of the optical disc 300. The flare 109 is called the "0"-recording-layer reflected flare 109.

As shown in FIG. 3, the optical pickup 100 includes a laser diode 305, a collimator lens 306, a grating 307, a polarization beam splitter 308, a quarter-wave plate 309, and an objective lens 310. The laser diode 305 emits laser light to the collimator lens 306. The collimator lens 306 changes the incident laser light into parallel laser light, and directs the parallel laser light to the grating 307. The grating 307 divides the parallel laser light into a main laser beam and two sub laser beams. The grating 307 directs the main laser beam and the sub laser beams to the polarization beam splitter 308. The polarization beam splitter 308 directs the main laser beam and the sub laser beams to the quarter-wave plate 309. The quarter-wave plate 309 passes the main laser beam and the sub laser beams to the objective lens 310. The objective lens 310 focuses the main laser beam and the sub laser beams on either the "0" recording layer 300A or the "1" recording layer 300B of the optical disc 300. In FIG. 3, the objective lens 310 focuses the main laser beam and the sub laser beams on the "1" recording layer 300B.

The main laser beam and the sub laser beams are reflected by the optical disc 300, causing a main reflected beam and sub reflected beams respectively.

The optical pickup 100 further includes a detection lens 311, the sub photodetectors 104 and 105, and the main photodetector 106. The main reflected beam and the sub reflected beams pass through the objective lens 310, the quarter-wave plate 309, and the polarization beam splitter 308 before reaching the detection lens 311. The detection lens 311 focuses the sub reflected beams on the sub photodetectors 104 and 105 respectively. The detection lens 311 focuses the main reflected beam on the main photodetector 106. The sub photodetectors 104 and 105 convert the sub reflected beams into corresponding electric signals. The main photodetector 106 converts the main reflected beam into a corresponding electric signal.

It should be noted that the grating 307 and the quarter-wave plate 309 may be omitted from the optical pickup 100. In this case, the polarization beam splitter 308 is replaced by a general beam splitter.

During the reproduction of a signal (information) from the "1" recording layer 300B of the optical disc 300, the main laser beam from the optical pickup 100 passes through the "0" recording layer 300A of the optical disc 300 and is focused into a spot on the "1" recording layer 300B thereof. At this time, the main laser beam is partially reflected by the "0" recording layer 300A. The "0" recording layer 300A is near the spot on the "1" recording layer 300B since the "0" recording layer 300A is separated from the "1" recording layer 300B by only a very-thin space layer (not shown). Therefore, a reflected beam 304 which results from the reflection of the main laser beam at the "0" recording layer 300A returns to the optical pickup 100 as the "0"-recording-layer reflected flare 109. As previously mentioned, the circular zone in the optical pickup 100 which covers the sub photodetectors 104 and 105 and the main photodetector 106 is exposed to the "0"-recording-layer reflected flare 109.

The sub photodetectors 104 and 105 and the main photodetector 106 are exposed to portions of the "0"-recording-layer reflected flare 109 which are substantially equal in intensity. In the case of a tracking servo system using DPP (differential push-pull) calculation responsive to the electric signals generated by the sub photodetectors 104 and 105 and the main photodetector 106, the "0"-recording-layer reflected flare portions received by the sub photodetectors 104 and 105 and the main photodetector 106 are canceled in the DPP calculation. Therefore, the "0"-recording-layer reflected flare 109 is prevented from adversely affecting the DPP tracking servo system. When the main laser beam emitted from the optical pickup 100 is focused on the "1" recording layer 303B of the optical disc 300, the intensity of the reflected beam resulting from the reflection of the main laser beam at the "1" recording layer 303B and received by the main photodetector 106 is remarkably higher than the intensity of the "0"-recording-layer reflected flare portion received by the main photodetector 106. Therefore, the "0"-recording-layer reflected flare portion is prevented from adversely affecting a focusing servo system responsive to the electric signal generated by the main photodetector 106.

It should be noted that the optical pickup 100 may emit only one laser beam (a main laser beam) rather than three laser beams being main and sub laser beams. In this optical pickup 100, a sub photodetector for receiving a portion of the "0"-recording-layer reflected flare 109 is located near the main photodetector 106.

Figure 5:
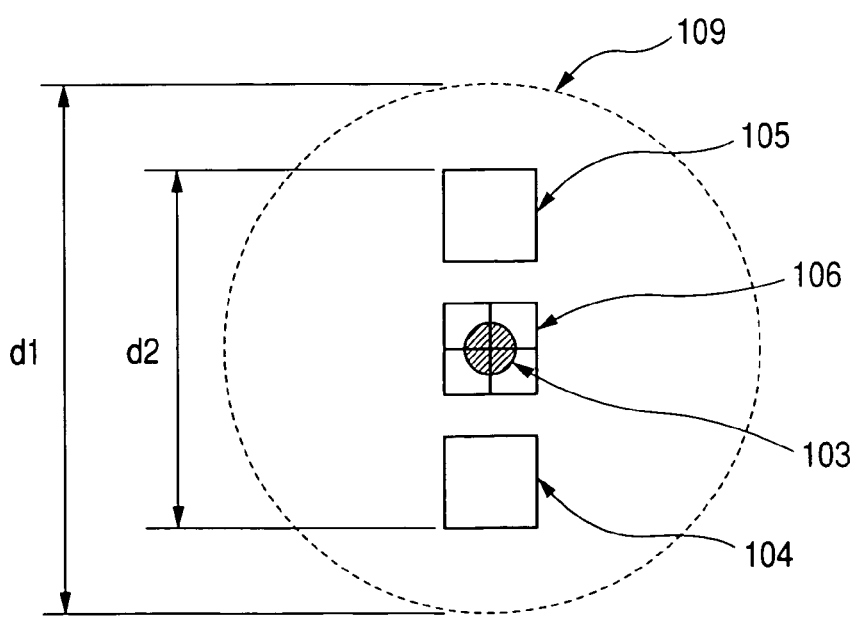
FIG. 5 is a plan view of photodetectors and a circular zone exposed to "0"-recording-layer reflected flare in the optical pickup of FIG. 3.

As shown in FIG. 5, the sub photodetectors 104 and 105 and the main photodetector 106 are arranged in a line. The main photodetector 106 is located between the sub photodetectors 104 and 105. Preferably, the sub photodetectors 104 and 105 and the main photodetector 106 extend in the circular zone exposed to the "0"-recording-layer reflected flare 109. Thus, the length d2 of the line of the sub photodetectors 104 and 105 and the main photodetector 106 is smaller than the diameter d1 of the circular zone exposed to the "0"-recording-layer reflected flare 109. The line of the sub photodetectors 104 and 105 and the main photodetector 106 may be in any direction perpendicular to the optical axis.

As shown in FIG. 2, the optical pickup 100 includes a sub IV amplifier 107 and a main I/V amplifier 108. As previously mentioned, the sub photodetectors 104 and 105 convert the sub reflected beams into corresponding electric signals. The sub photodetectors 104 and 105 output the electric signals to the sub I/V amplifier 107. As previously mentioned, the main photodetector 106 converts the main reflected beam into a corresponding electric signal. The main photodetector 106 outputs the electric signal to the main IV amplifier 108. The sub I/V amplifier 107 generates an SBAD signal (a voltage signal) from the output signals of the sub photodetectors 104 and 105 through current-to-voltage conversion. The SBAD signal is the sum of the output signals of the sub photodetectors 104 and 105. The sub I/V amplifier 107 outputs the SBAD signal to a signal detector 111. It should be noted that only one of the output signals of the sub photodetectors 104 and 105 may be transmitted to the signal detector 111 via the I/V amplifier 107. The main I/V amplifier 108 generates a voltage signal from the output signal of the main photodetector 106 through current-to-voltage conversion. The main I/V amplifier 108 outputs the voltage signal to an address detector 113.

A misalignment between the track centers concerning the "0" recording layer and the "1" recording layer of the optical disc 300 causes the phenomenon that during the reproduction of a signal (information) from the "1" recording layer of the optical disc 300, the voltage of the SBAD signal varies synchronously with the rotation of the optical disc 300. Every variation in the voltage of the SBAD signal occurs when the currently-accessed position on the optical disc 300 is at or around the boundary between a signal recorded area (a signal-already-recorded area) and a signal unrecorded area in the "0" recording layer of the optical disc 300. The signal detector 111 operates to detect a peak or a mean of the voltage of the SBAD signal in a known way. The detected peak voltage or the detected mean voltage is repetitively updated. The detected mean voltage results from a low pass filtering process or an integrating process. The signal detector 111 notifies a checker 112 of the detected peak voltage or the detected mean voltage.

The apparatus includes a write-purpose drive which preliminarily carries out inspection-purpose recording on the optical disc 300. Specifically, the apparatus designates a recording start address and a recording end address. The write-purpose drive records dummy data (a dummy signal) on an area in the "0" recording layer of the optical disc 300 between the recording start address and the recording end address. As a result, an inspection-purpose signal recorded area 301 (see FIG. 3) is formed in the "0" recording layer. The apparatus recognizes the recording start address and the recording end address, that is, the start address and the end address of the inspection-purpose signal recorded area 301.

With reference to FIG. 3, during the reproduction of information (a signal) from a signal unrecorded area 303 in the "1" recording layer of the optical disc 300, when a position in the "0" recording layer which radially coincides with the currently-accessed position in the "1" recording layer is in the signal recorded area 301 in the "0" recording layer, the peak or mean voltage V1H detected by the signal detector 111 is relatively low. On the other hand, when the foregoing position in the "0" recording layer is in a signal unrecorded area 302 in the "0" recording layer, the peak or mean voltage V2H detected by the signal detector 111 is relatively high. When the foregoing position in the "0" recording layer is at or around the boundary between the signal recorded area 301 and the signal unrecorded area 302 in the "0" recording layer, the peak or mean voltage detected by the signal detector 111 is intermediate.

In FIG. 3, the inclined lines 313 and 314 denote the peak voltage detected by the signal detector 111, and the inclined lines 315 and 316 denote the mean voltage detected by the signal detector 111. It is preferable to decide which of the peak voltage and the mean voltage the signal detector 111 detects in accordance with a SBAD signal condition varying with the rotation of the optical disc 300.

With reference to FIG. 3, during the reproduction of information (a signal) from a signal recorded area in the "1" recording layer of the optical disc 300, when a position in the "0" recording layer which radially coincides with the currently-accessed position in the "1" recording layer is in the signal recorded area 301 in the "0" recording layer, the peak or mean voltage V1L detected by the signal detector 111 is relatively low. On the other hand, when the foregoing position in the "0" recording layer is in the signal unrecorded area 302 in the "0" recording layer, the peak or mean voltage V2L detected by the signal detector 111 is relatively high. When the foregoing position in the "0" recording layer is at or around the boundary between the signal recorded area 301 and the signal unrecorded area 302 in the "0" recording layer, the peak or mean voltage detected by the signal detector 111 is intermediate. Since the currently-accessed position in the "1" recording layer is in the signal recorded area, the effective reflectivity of the optical disc 300 is low. Thus, the peak or mean voltages V1L and V2L are lower than the previously-mentioned corresponding peak or mean voltages V1H and V2H, respectively.

The address detector 113 demodulates the output signal of the main I/V amplifier 108 to detect an on-disc address (an ECC block address) of the currently-accessed position on the optical disc 300. The address detector 113 notifies the checker 112 of the detected on-disc address. In the later description, "address" means "ECC block address".

The checker 112 is able to control the optical pickup 100 and a display in the apparatus. The checker 112 includes, for example, a CPU or a computer-based device having a combination of an input/output port, a processing section, a ROM, and a RAM. In this case, the checker 112 operates in accordance with a control program (a computer program) stored in the ROM or the RAM. The control program is designed to enable the checker 112 to carry out actions mentioned later.

As previously mentioned, the inspection-purpose signal recorded area 301 is formed in the "0" recording layer of the optical disc 300 in advance. The apparatus recognizes the recording start address and the recording end address, that is, the start address and the end address of the inspection-purpose signal recorded area 301. Therefore, the checker 112 in the apparatus also recognizes the recording start address and the recording end address. The checker 112 uses the recording start address or the recording end address in determining an allowable error range of a tack position in the "1" recording layer which should align or radially coincide with an in-"0"-recording-layer track position at the recording start address or the recording end address. The checker 112 calculates a specified address in the "1" recording layer from the recording start address or the recording end address. The specified address corresponds to the upper limit of the allowable error range. The checker 112 receives the detected address of the currently-accessed position in the "1" recording layer from the address detector 113. The checker 112 detects when the detected address reaches the specified address. The checker 112 receives the detected peak or mean voltage from the signal detector 111. The checker 112 samples the detected peak or mean voltage when the detected address reaches the specified address. The checker 112 decides whether or not the sampled peak or mean voltage is substantially equal to a prescribed level corresponding to a level caused by the "0"-recording-layer reflected flare 109. The checker 112 concludes that the optical disc 300 conforms to the standards in the case where the sampled peak or mean voltage is substantially equal to the prescribed level.

In more detail, the checker 112 calculates a reference address in the "1" recording layer of the optical disc 300 from each of the recording start address and the recording end address. The reference address is the same as a desired address of a place in the "1" recording layer which should align or radially coincide with an in-"0"-recording-layer position at the recording start address or the recording end address. Then, the checker 112 calculates an allowable error limit address (a specified address) from the reference address. An on-disc position at the allowable error limit address is radially separated from that at the reference address by a distance corresponding to an allowable error range. The checker 112 detects when the detected address notified by the address detector 113 reaches the allowable error limit address. The checker 112 samples the detected peak or mean voltage notified by the signal detector 111 when the detected address reaches the allowable error limit address. The checker 112 decides whether or not the sampled peak or mean voltage is substantially equal to a prescribed level corresponding to a level caused by reflected laser light resulting from the reflection of the main laser beam at the "0" recording layer of the optical disc 300, that is, a level caused by the "0"-recording-layer reflected flare 109. In the case where the sampled peak or mean voltage is substantially equal to the prescribed level, the checker 112 concludes that the radial position error between track portions in the "0" recording layer and the "1" recording layer which should be at the same radial position is within a prescribed allowable range, or the optical disc 300 conforms to the standards. Briefly, the checker 112 concludes that a misalignment or an eccentricity between the tracks on the "0" and "1" recording layers is within an allowable range, or that an address error between track portions in the "0" and "1" recording layers which should align or radially coincide with each other is within an allowable range. On the other hand, in the case where the sampled peak or mean voltage is not substantially equal to the prescribed level, the checker 112 concludes that the radial position error is outside the prescribed allowable range, or the optical disc 300 does not conform to the standards.

Figure 6:
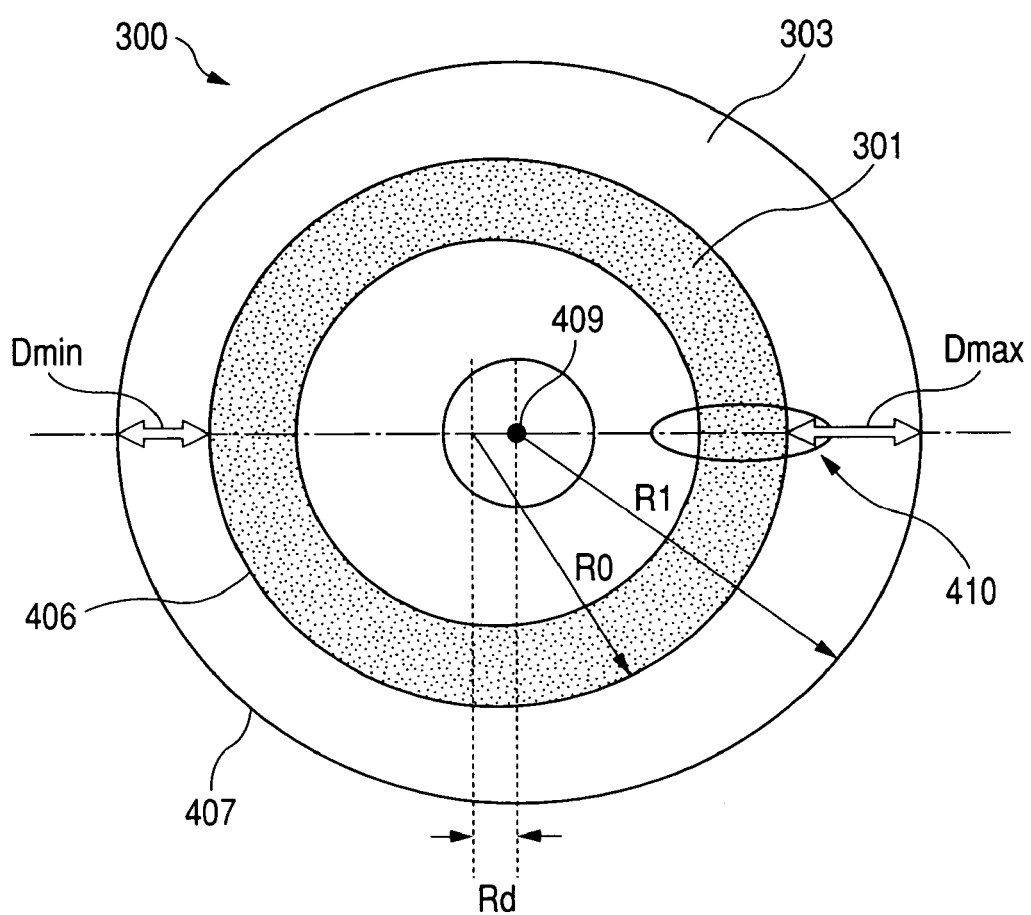
FIG. 6 is a diagram of track turns on "0" and "1" recording layers of an optical disc.

With reference to FIG. 6, there is a signal recorded area 301 in the "0" recording layer of the optical disc 300. There is a signal unrecorded area 303 in the "1" recording layer of the optical disc 300. In some cases, the center of a turn 406 of a track on the "0" recording layer and the center of a turn 407 of a track on the "1" recording layer are out of coincidence. The distance between these centers is defined as a center error quantity (a center deviation quantity or an eccentricity) Rd. The radius of the turn 406 of the track on the "0" recording layer is denoted by the reference character "R0". The radius of the turn 407 of the track on the "1" recording layer is denoted by the reference character "R1".

In FIG. 6, the center of the track on the "1" recording layer substantially coincides with the center 409 of the rotation of the optical disc 300. On the other hand, the center of the track on the "0" recording layer is out of coincidence with the center 409 of the rotation of the optical disc 300. Therefore, as viewed on a radial line with respect to the optical disc 300, the position of the boundary between the signal recorded area 301 and the adjacent signal unrecorded area in the "0" recording layer radially reciprocates in synchronism with the rotation of the optical disc 300. Thus, a track position in the "1" recording layer which radially coincides with the position of the turn 406 of the track on the "0" recording layer has an error relative to an in-"0"-recording-layer track position. The error is in the range between a lower limit and an upper limit called a minimum relative error Dmin and a maximum relative error Dmax respectively.

Figure 7:
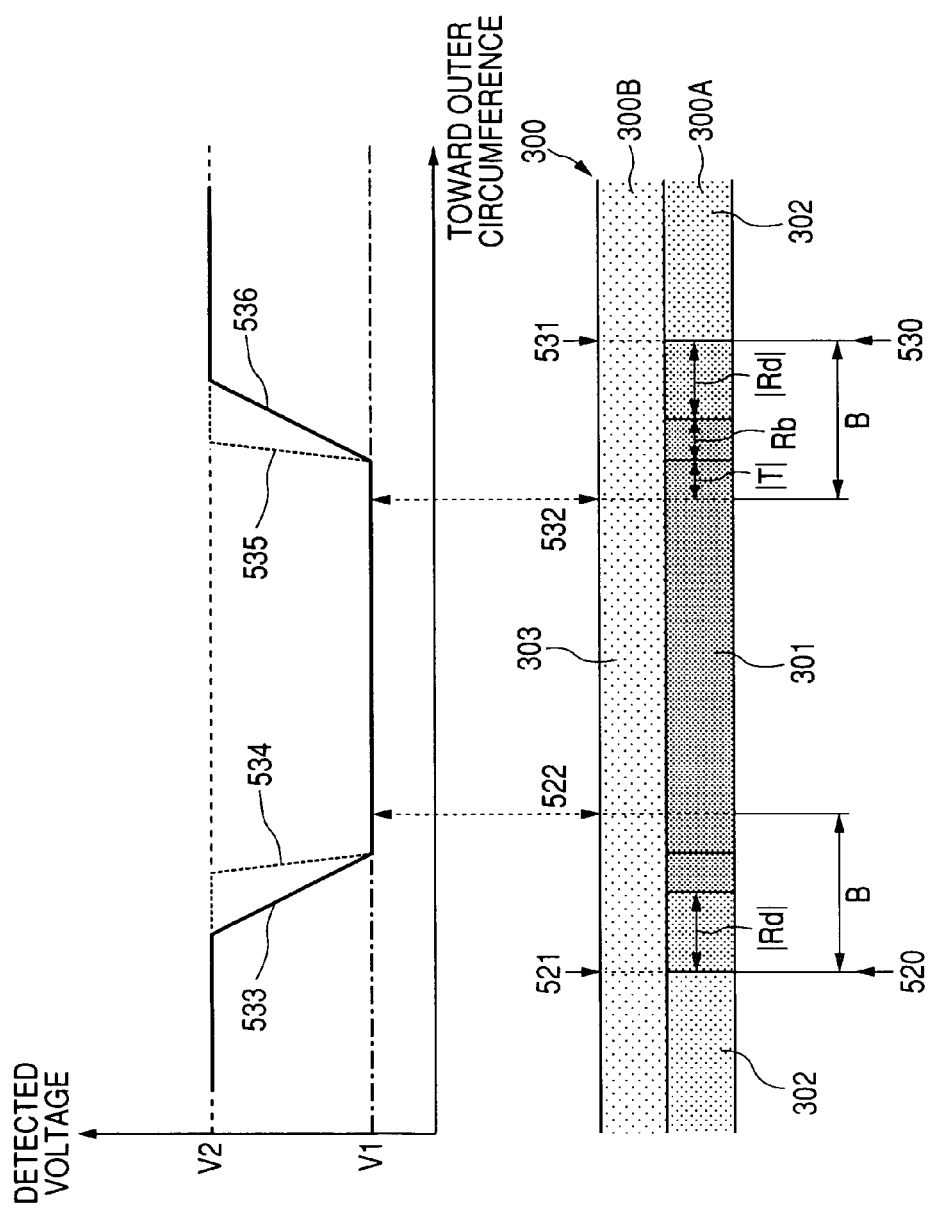
FIG. 7 is a diagram of an optical disc and a detected voltage obtained by the signal detector in FIG. 2.

In FIG. 6, when the optical pickup 100 reproduces information (a signal) from the optical disc 300 and is moved radially outward in a certain zone 410 on the optical disc 300, the peak or mean voltage detected by the signal detector 111 varies as shown in FIG. 7.

With reference to FIG. 7, the inspection-purpose signal recorded area 301 is in the "0" recording layer of the optical disc 300. The start address and the end address of the inspection-purpose signal recorded area 301 are denoted by the reference numerals "520" and "530", respectively. A maximum allowable error B means an allowable error range of a tack position in the "1" recording layer which should align or radially coincide with an in-"0"-recording-layer track position at the recording start address 520 or the recording end address 530. The checker 112 preliminarily calculates the maximum allowable error B in the following way.

The maximum allowable error B is equal to the sum of a maximum eccentricity error |Rd|, the radius Rb of the main laser beam in the "0" recording layer, and a maximum tolerance |T|. The maximum allowable error B means an allowable error range of a tack position in the "1" recording layer which should align or radially coincide with a prescribed in-"0"-recording-layer track position. The checker 112 calculates the maximum allowable error B from the values |Rd|, Rb, and |T| according to an equation as "B=|T|+|Rd|+Rb". The maximum tolerance |T| is equal to 0.04 mm. The maximum eccentricity error |Rd| is equal to 0.05 mm. The radius Rb is given as "Rb=L·tan(sin$^{-1}$(NA/n))" where L denotes the thickness of the space layer between the "0" recording layer and the "1" recording layer of the optical disc 300, and NA denotes a laser numerical aperture of the related measuring system in the apparatus and "n" denotes a refractive index of the optical disc 300.

An in-"1"-recording-layer track position which aligns or radially coincides with the in-"0"-recording-layer track position at the recording start address 520 should be assigned to a desired address (a first reference address) 521. An in-"1"-recording-layer track position which aligns or radially coincides with the in-"0"-recording-layer track position at the recording end address 530 should be assigned to a desired address (a second reference address) 531. A first allowable error limit address 522 indicates an in-"1"-recording-layer position which is radially outwardly separated from that at the first reference address 521 by a distance corresponding to the maximum allowable error B (the allowable error range). A second allowable error limit address 532 indicates an in-"1"-recording-layer position which is radially inwardly separated from that at the second reference address 531 by a distance corresponding to the maximum allowable error B (the allowable error range). The first and second allowable error limit addresses 522 and 532 are expressed by ECC block addresses Mz and My, respectively.

The checker 112 calculates the ECC block addresses My and Mz according to the following equations.

$$My = YY + Ax - \{B(2 \cdot Ry - B)\pi\}/C$$

$$Mz = ZZ + Ax + \{B(2 \cdot Rz - B)\pi\}/C$$

where "YY+Ax" means the second reference address 531; "ZZ+Ax" means the first reference address 521; B denotes the allowable maximum error (mm); Ry denotes the radius of a track turn at the recording end address 530; Rz denotes the radius of a track turn at the recording start address 520; C denotes a conversion coefficient equal to the area (mm$^2$) per ECC block; YY denotes an inversion of bits constituting data representing the recording end address 530; ZZ denotes an inversion of bits constituting data representing the recording start address 520; and Ax denotes the radial position difference of the track on the "1" recording layer from that on the "0" recording layer.

With reference to FIG. 7, the peak or mean voltage detected by the signal detector 111 is continuously monitored while the optical pickup 100 is fed radially inward to move the currently-accessed position in the "1" recording layer from the second reference address 531 to the second allowable error limit address 532. In the case where the peak or mean voltage detected by the signal detector 111 changes to a prescribed level V1 until the currently-accessed position in the "1" recording layer reaches the second allowable error limit address 532, it is concluded that an error in the radially-inward direction resides within an allowable range. The prescribed level V1 corresponds to a level caused by reflected laser light resulting from the reflection of the main laser beam at the "0" recording layer of the optical disc 300, that is, a level caused by the "0"-recording-layer reflected flare 109. Similarly, the peak or mean voltage detected by the signal detector 111 is continuously monitored while the optical pickup 100 is fed radially outward to move the currently-accessed position in the "1" recording layer from the first reference address 521 to the first allowable error limit address 522. In the case where the peak or mean voltage detected by the signal detector 111 changes to the prescribed level V1 until the currently-accessed position in the "1" recording layer reaches the first allowable error limit address 522, it is concluded that an error in the radially-outward direction resides within an allowable range. The peak or mean voltage detected by the signal detector 111 takes a prescribed level V2 when the main laser beam is focused on the "1" recording layer through a signal unrecorded area in the "0" recording layer. The prescribed level V2 is higher than the prescribed level V1.

Figure 8:
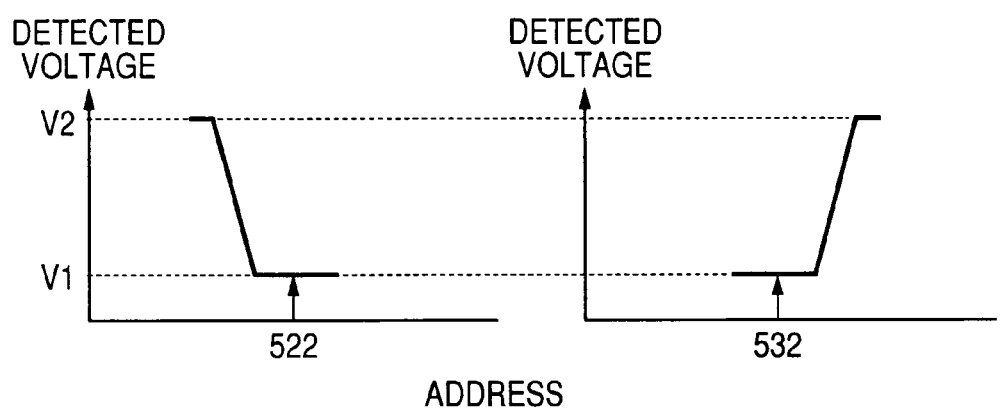
FIG. 8 is a diagram showing the relation among the detected voltage obtained by the signal detector in FIG. 2, a currently-accessed position on an optical disc, and on-disc positions at allowable error limit addresses which corresponds to the case where a misalignment between tracks on "0" and "1" recording layers of the optical disc is within an allowable range.
Figure 9:
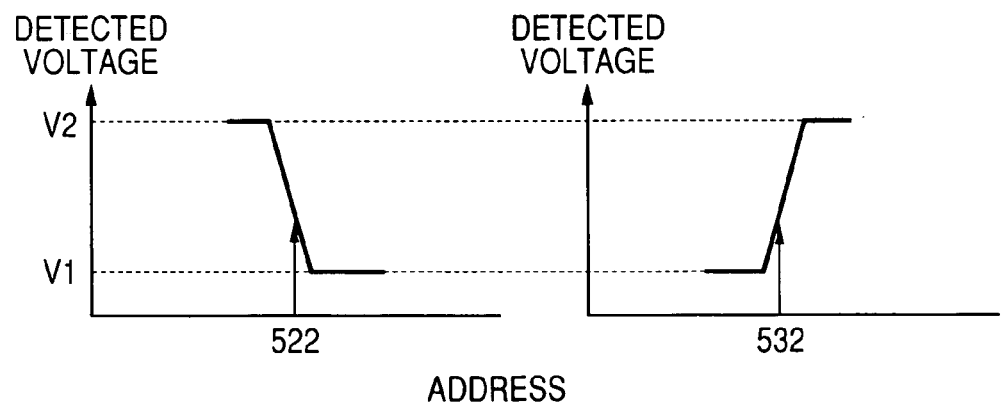
FIG. 9 is a diagram showing the relation among the detected voltage obtained by the signal detector in FIG. 2, a currently-accessed position on an optical disc, and on-disc positions at allowable error limit addresses which corresponds to the case where a misalignment between tracks on "0" and "1"-recording layers of the optical disc is outside the allowable range.

As previously mentioned, the checker 112 receives the detected address of the currently-accessed position in the "1" recording layer from the address detector 113. The checker 112 compares the detected address with the first and second allowable error limit addresses 522 and 532, and thereby detects when the detected address reaches one of the first and second allowable error limit addresses 522 and 532. As previously mentioned, the checker 112 receives the detected peak or mean voltage from the signal detector 111. The checker 112 samples the detected peak or mean voltage when the detected address is equal to one of the first and second allowable error limit addresses 522 and 532. In other words, the checker 112 samples the detected peak or mean voltage corresponding to one of the first and second allowable error limit addresses 522 and 532. The checker 112 decides whether or not the sampled peak or mean voltage corresponding to the first allowable error limit address 522 is substantially equal to the prescribed level V1 (corresponding to a level caused by reflected laser light resulting from the reflection of the main laser beam at the "0" recording layer of the optical disc 300, that is, a level caused by the "0"-recording-layer reflected flare 109). Furthermore, the checker 112 decides whether or not the sampled peak or mean voltage corresponding to the second allowable error limit address 532 is substantially equal to the prescribed level V1. In the case where the sampled peak or mean voltage corresponding to each of the first and second allowable error limit addresses 522 and 532 is substantially equal to the prescribed level V1 as shown in FIG. 8, the checker 112 concludes that the radial position error between track portions in the "0" recording layer and the "1" recording layer which should be at the same radial position is within a prescribed allowable range, or the optical disc 300 conforms to the standards. Briefly, the checker 112 concludes that a misalignment or an eccentricity between the tracks on the "0" and "1" recording layers is within an allowable range, or that an address error between track portions in the "0" and "1" recording layers which should align or radially coincide with each other is within an allowable range. On the other hand, in the case where the sampled peak or mean voltage corresponding to at least one of the first and second allowable error limit addresses 522 and 532 is not substantially equal to the prescribed level V1, the checker 112 concludes that the radial position error is outside the prescribed allowable range, or the optical disc 300 does not conform to the standards. For example, in the case where the sampled peak voltage or the sampled mean voltage corresponding to each of the first and second allowable error limit addresses 522 and 532 appreciably differs from the prescribed level V1 as shown in FIG. 9, the checker 112 concludes that the radial position error is outside the prescribed allowable range, or the optical disc 300 does not conform to the standards.

In FIG. 7, the inclined lines 533 and 536 denote the mean voltage detected by the signal detector 111, and the inclined lines 534 and 535 denote the peak voltage detected by the signal detector 111. The detected peak voltage exhibits steep variations. Accordingly, the decision by the checker 112 in response to the detected peak voltage is easy. The detected mean voltage is hardly affected by noises in the SBAD signal. Therefore, the decision by the checker 112 in response to the detected mean voltage is reliable against noises in the SBAD signal. It is preferable to decide which of the peak voltage and the mean voltage the signal detector 111 detects in accordance with a SBAD signal condition varying with the rotation of the optical disc 300.

It should be noted that the checker 112 may be modified to operate as follows. In the case where the sampled peak or mean voltage corresponding to only one of the first and second allowable error limit addresses 522 and 532 is substantially equal to the prescribed level V1, the checker 112 concludes that the radial position error between track portions in the "0" recording layer and the "1" recording layer which should be at the same radial position is within a prescribed allowable range, or the optical disc 300 conforms to the standards.

The optical disc 300 has land pre-pits (LPP) representing on-disc address information. During the recording and reproduction of information (a signal) on and from the optical disc 300, the optical pickup 100 reproduces the LPP address information from the optical disc 300. Preferably, the address detector 113 detects an on-disc address (an ECC block address) of the currently-accessed position on the optical disc 300 by referring to the reproduced LPP address information.

Figure 10:
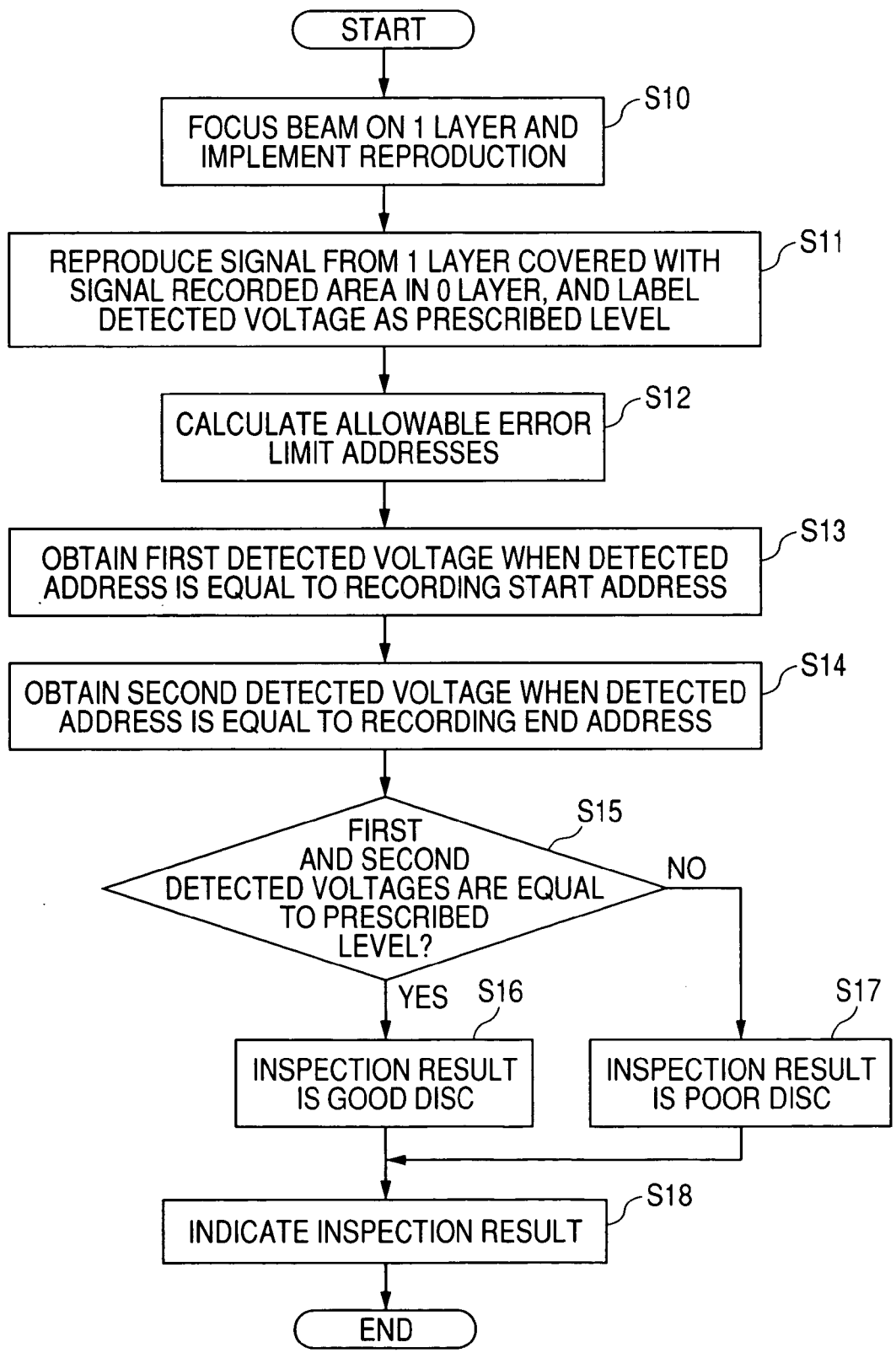
FIG. 10 is a flowchart of a control program for a checker in FIG. 2.

As previously mentioned, the checker 112 operates in accordance with a control program (a computer program). FIG. 10 is a flowchart of the control program.

As shown in FIG. 10, a first step S10 of the program controls the optical pickup 100 to focus the main and sub laser beams on the "1" recording layer of the optical disc 300 and reproduce information (a signal) therefrom.

A step S11 following the step S10 controls the optical pickup 100 in response to the recording start address 520 and the recording end address 530 to align the currently-accessed position in the "1" recording layer with an in-"0"-recording-layer position in a central part of the inspection-purpose signal recorded area 301 in the "0" recording layer. Then, the step S11 samples the detected voltage notified by the signal detector 111. The step S11 labels the sampled voltage as the prescribed level V1. As previously mentioned, the prescribed level V1 corresponds to a level caused by reflected laser light resulting from the reflection of the main laser beam at the "0" recording layer of the optical disc 300, that is, a level caused by the "0"-recording-layer reflected flare 109. The detected voltage notified by the signal detector 111 is the peak voltage or the mean voltage.

A step S12 subsequent to the step S11 calculates the first and second allowable error limit addresses 522 and 532 in the previously-mentioned way.

A step S13 following the step S12 controls the optical pickup 100 in response to the recording start address 520 to equalize the detected address notified by the address detector 113 to the recording start address 520. When the detected address is equal to the recording start address 520, the step S13 samples the detected voltage notified by the signal detector 111. The step S13 labels the sampled voltage as a first detected voltage FV.

A step S14 subsequent to the step S13 controls the optical pickup 100 in response to the recording end address 530 to equalize the detected address notified by the address detector 113 to the recording end address 530. When the detected address is equal to the recording end address 530, the step S14 samples the detected voltage notified by the signal detector 111. The step S14 labels the sampled voltage as a second detected voltage SV.

A step S15 following the step S14 decides whether or not the first and second detected voltages FV and SV are substantially equal to the prescribed level V1. When the first and second detected voltages FV and SV are substantially equal to the prescribed level V1, the program advances from the step S15 to a step S16. Otherwise, the program advances from the step S15 to a step S17.

The step S15 may decide whether or not at least one of the first and second detected voltages FV and SV is substantially equal to the prescribed level V1. In this case, when at least one of the first and second detected voltages FV and SV is substantially equal to the prescribed level V1, the program advances from the step S15 to the step S16. Otherwise, the program advances from the step S15 to the step S17.

The step S16 concludes that the radial position error between track portions in the "0" recording layer and the "1" recording layer which should be at the same radial position is within a prescribed allowable range, or the optical disc 300 conforms to the standards. In other words, the step S16 concludes the optical disc 300 to be good. The step S16 sets an inspection result signal to represent the contents of this conclusion, for example, a message "good disc". After the step S16, the program advances to a step S18.

The step S17 concludes that the radial position error between track portions in the "0" recording layer and the "1" recording layer which should be at the same radial position is outside the prescribed allowable range, or the optical disc 300 does not conform to the standards. In other words, the step S17 concludes the optical disc 300 to be poor. The step S17 sets the inspection result signal to represent the contents of this conclusion, for example, a message "poor disc". After the step S17, the program advances to the step S18.

The step S18 controls the display of the apparatus to indicate the message represented by the inspection result signal. After the step S18, the current execution cycle of the program ends.

Second Specific Embodiment

A second specific embodiment of this invention is similar to the first specific embodiment thereof except for design changes mentioned hereafter. According to the second specific embodiment of this invention, during the reproduction of information (a signal) from the "0" recording layer of an optical disc, the sub photodetectors 104 and 105 in the optical pickup 100 detect flare caused by the reflection of the main laser beam at the "1" recording layer of the optical disc. The optical disc is inspected on the basis of the detected flare.

Figure 11:
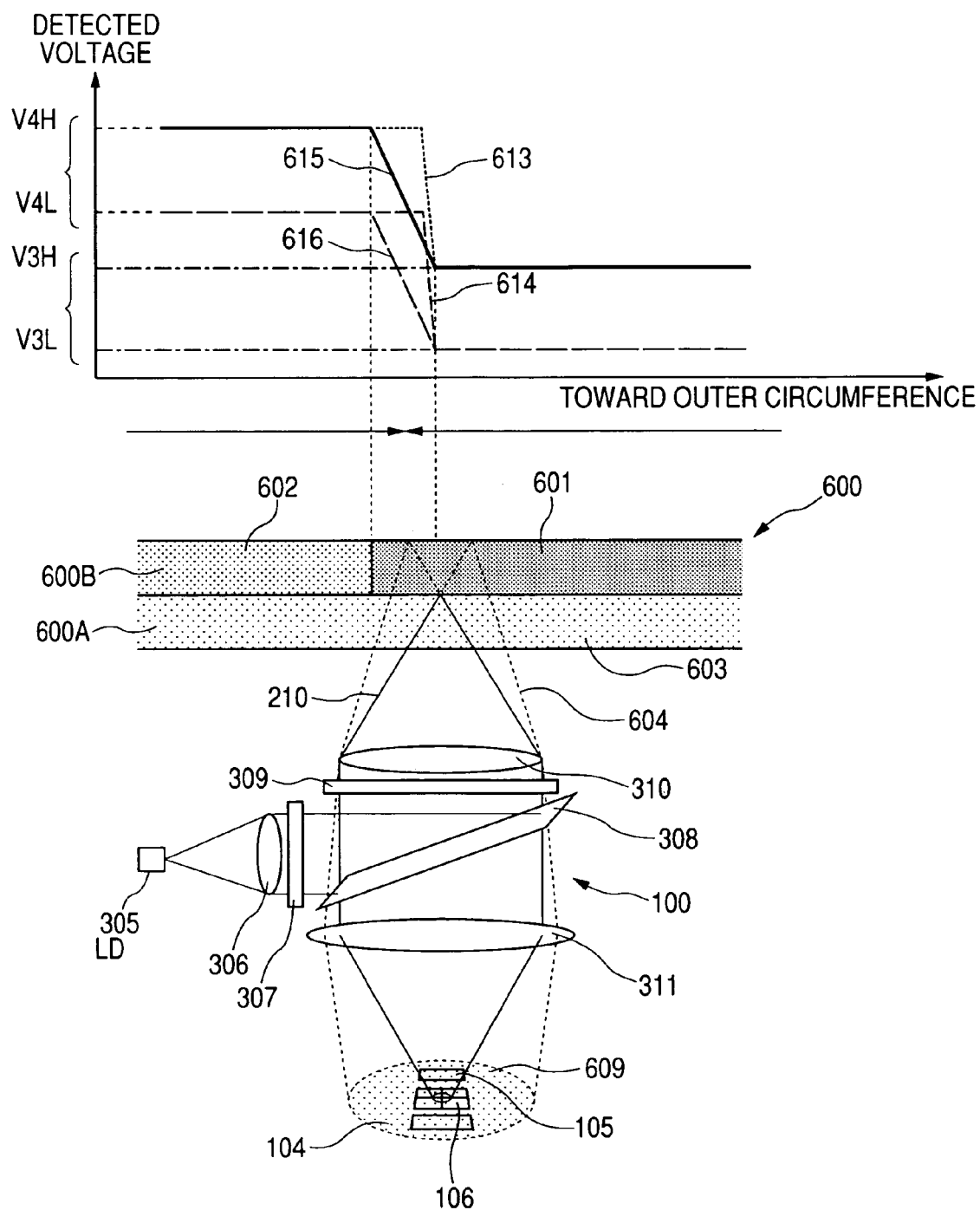
FIG. 11 is a diagram of an optical pickup, an optical disc, and a detected voltage obtained by a signal detector in a second specific embodiment of this invention.

With reference to FIG. 11, an optical disc 600 has a "0" recording layer 600A and a "1" recording layer 600B. An inspection-purpose signal recorded area 601 is preliminarily formed in the "1" recording layer 600B. There is a signal unrecorded area 602 in the "1" recording layer 600B which neighbors the inspection-purpose signal recorded area 601. The "0" recording layer 600A has a signal unrecorded area 603 which covers the inspection-purpose signal recorded area 601 in the "1" recording layer 600B. During the inspection of the optical disc 600, the main laser beam from the optical pickup 100 is focused on the signal unrecorded area 603 in the "0" recording layer 600A to reproduce information (a signal) therefrom.

A major portion of the main laser beam 210 is reflected by the "0" recording layer 600A, and causes the main reflected beam. A minor portion of the main laser beam 210 passes through the "0" recording layer 600A before reaching the "1" recording layer 600B and being reflected by the "1" recording layer 600B. The reflected laser beam 604 returns from the "1" recording layer 600B to the optical pickup 100 as flare 609 called "1"-recording-layer reflected flare 609.

The sub photodetectors 104 and 105 and the main photodetector 106 in the optical pickup 100 are exposed to the "1"-recording-layer reflected flare 609. The sub photodetectors 104 and 105 convert incident portions of the "1"-recording-layer reflected flare 609 into corresponding electric signals. The sub photodetectors 104 and 105 output the electric signals to the sub I/V amplifier 107 (see FIG. 2). The sub I/V amplifier 107 generates an SBAD signal (a voltage signal) from the output signals of the sub photodetectors 104 and 105 through current-to-voltage conversion. The SBAD signal is the sum of the output signals of the sub photodetectors 104 and 105. The sub I/V amplifier 107 outputs the SBAD signal to the signal detector 111. It should be noted that only one of the output signals of the sub photodetectors 104 and 105 may be transmitted to the signal detector 111 via the sub I/V amplifier 107.

Figure 12:
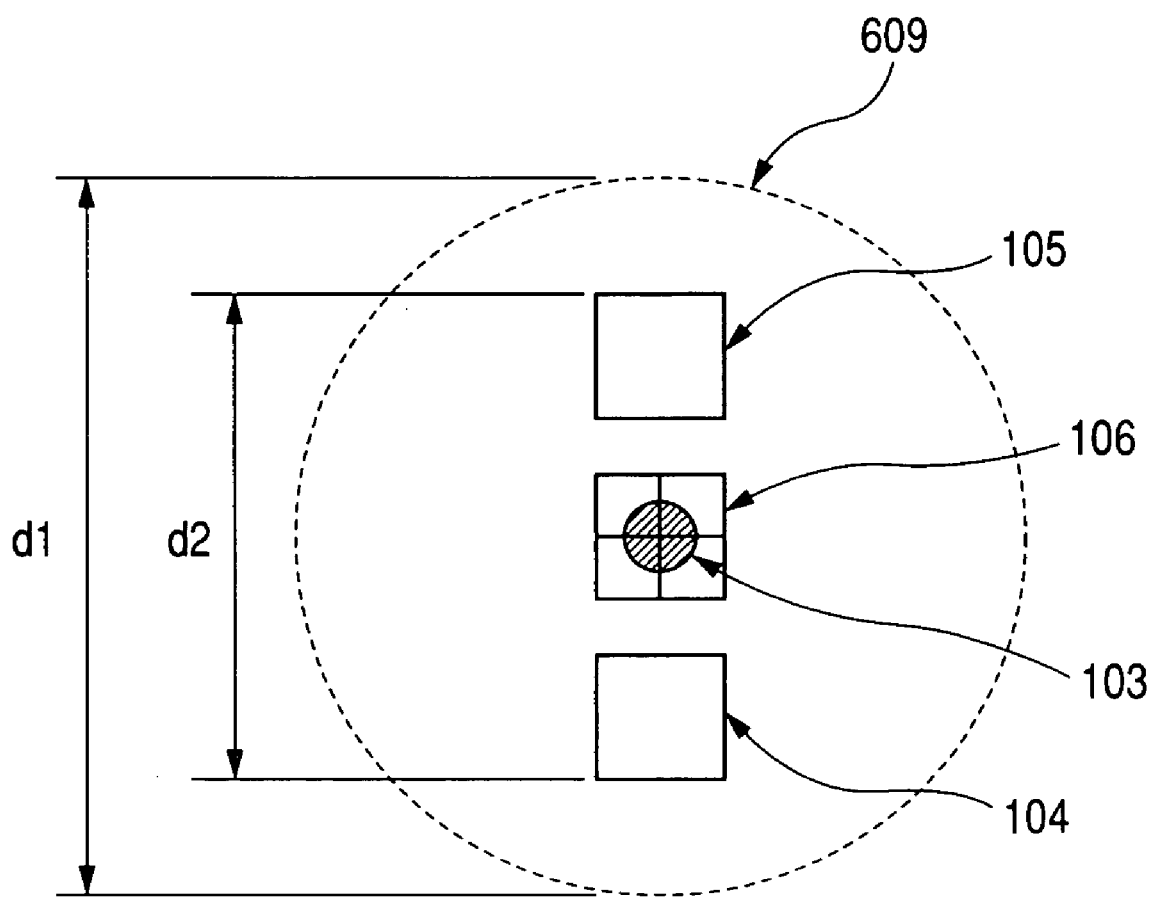
FIG. 12 is a plan view of photodetectors and a circular zone exposed to "1" recording-layer reflected flare in the optical pickup of FIG. 11.

As shown in FIG. 12, the sub photodetectors 104 and 105 and the main photodetector 106 of the optical pickup 100 are arranged in a line. The main photodetector 106 is located between the sub photodetectors 104 and 105. Preferably, the sub photodetectors 104 and 105 and the main photodetector 106 extend in the circular zone exposed to the "1"-recording-layer reflected flare 609. Thus, the length d2 of the line of the sub photodetectors 104 and 105 and the main photodetector 106 is smaller than the diameter d1 of the circular zone exposed to the "1"-recording-layer reflected flare 609.

With reference to FIG. 11, during the reproduction of information (a signal) from the signal unrecorded area 603 in the "0" recording layer of the optical disc 300, when a position in the "1" recording layer which radially coincides with the currently-accessed position in the "0" recording layer is in the inspection-purpose signal recorded area 601, the peak or mean voltage V3H detected by the signal detector 111 is relatively low. On the other hand, when the foregoing position in the "1" recording layer is in the signal unrecorded area 602, the peak or mean voltage V4H detected by the signal detector 111 is relatively high. When the foregoing position in the "1" recording layer is at or around the boundary between the inspection-purpose signal recorded area 601 and the signal unrecorded area 602, the peak or mean voltage detected by the signal detector 111 is intermediate.

In FIG. 11, the inclined lines 613 and 614 denote the peak voltage detected by the signal detector 111, and the inclined lines 615 and 616 denote the mean voltage detected by the signal detector 111.

During the reproduction of information (a signal) from a signal recorded area in the "0" recording layer of the optical disc 300, when a position in the "1" recording layer which radially coincides with the currently-accessed position in the "0" recording layer is in the inspection-purpose signal recorded area 601, the peak or mean voltage V3L detected by the signal detector 111 is relatively low. On the other hand, when the foregoing position in the "1" recording layer is in the signal unrecorded area 602, the peak or mean voltage V4L detected by the signal detector 111 is relatively high. When the foregoing position in the "1" recording layer is at or around the boundary between the inspection-purpose signal recorded area 601 and the signal unrecorded area 602, the peak or mean voltage detected by the signal detector 111 is intermediate. Since the currently-accessed position in the "0" recording layer is in the signal recorded area, the effective reflectivity of the optical disc 300 is low. Thus, the peak or mean voltages V3L and V4L are lower than the previously-mentioned corresponding peak or mean voltages V3H and V4H, respectively.

An optical-disc inspection apparatus in the second specific embodiment of this invention designates a recording start address and a recording end address. The apparatus records dummy data (a dummy signal) on an area in the "1" recording layer of the optical disc 600 between the recording start address and the recording end address to form the inspection-purpose signal recorded area 601.

The checker 112 (see FIG. 2) in the apparatus calculates first and second reference addresses in the "0" recording layer of the optical disc 600 from the recording start address and the recording end address. The first reference address is the same as a desired address of a place in the "0" recording layer which should align or radially coincide with an in-"1"-recording-layer position at the recording start address. The second reference address is the same as a desired address of a place in the "0" recording layer which should align or radially coincide with an in-"1"-recording-layer position at the recording end address. Then, the checker 112 calculates first and second allowable error limit addresses from the first and second reference addresses. The first allowable error limit address indicates an in-"0"-recording-layer position which is radially outwardly separated from that at the first reference address by a distance corresponding to the maximum allowable error B (the allowable error range). The second allowable error limit address indicates an in-"0"-recording-layer position which is radially inwardly separated from that at the second reference address by a distance corresponding to the maximum allowable error B (the allowable error range).

The apparatus performs the inspection of the optical disc 600 in response to the first and second allowable error limit addresses as in the first specific embodiment of this invention.

The apparatus defines one of the peak or mean voltages V3H and V3L as a prescribed level V3. The apparatus defines one of the peak or mean voltages V4H and V4L as a prescribed level V4. The apparatus uses the prescribed levels V3 and V4 instead of the prescribed levels V1 and V2 in the first specific embodiment of this invention for the inspection of the optical disc 600. The apparatus obtains first and second detected voltages FV and SV as in the first specific embodiment of this invention. The apparatus decides whether or not the first and second detected voltages FV and SV are substantially equal to the prescribed level V3. When the first and second detected voltages FV and SV are substantially equal to the prescribed level V3, the apparatus concludes that the radial position error between track portions in the "0" recording layer and the "1" recording layer which should be at the same radial position is within a prescribed allowable range, or the optical disc 600 conforms to the standards. Otherwise, the apparatus concludes that the radial position error between track portions in the "0" recording layer and the "1" recording layer which should be at the same radial position is outside the prescribed allowable range, or the optical disc 600 does not conform to the standards.

It should be noted that the apparatus may conclude the optical disc 600 to be in conformity to the standards when at least one of the first and second detected voltages FV and SV is substantially equal to the prescribed level V3.

Third Specific Embodiment

A third specific embodiment of this invention is similar to the first or second specific embodiment thereof except for design changes described hereafter.

According to the third specific embodiment of this invention, the control program for the checker 112 is initially stored in a recording medium. The control program is read out from the recording medium before being loaded into the checker 112.

Alternatively, the control program may be downloaded to the checker 112 via a transmission line or a communication line.

What is claimed is:

1. An apparatus for inspecting an optical disc having multiple recording layers including first and second recording layers adjacent to each other, the second recording layer having a signal recorded area and a signal unrecorded area, wherein a boundary between the signal recorded area and the signal unrecorded area is at a prescribed address on a track on the second recording layer, the apparatus comprising:

an optical pickup for applying a main laser beam to the optical disc, for focusing the main laser beam on one of the multiple recording layers, and for receiving reflected light caused by reflection of the main laser beam at the one of the multiple recording layers to reproduce a recorded signal from the one of the multiple recording layers;

a first photodetector provided in the optical pickup for receiving a main reflected beam caused by reflection of the main laser beam at the one of the multiple recording layers;

a second photodetector provided in the optical pickup and separated from the first photodetector;

first means for detecting a level of a signal generated by the second photodetector in response to reflected light caused by reflection of the main laser beam at the second recording layer and incident to the second photodetector when the optical pickup reproduces a recorded signal from the first recording layer;

second means for detecting an address of a currently-accessed position in a track on the first recording layer from a signal generated by the first photodetector in response to reflected light caused by reflection of the main laser beam at the first recording layer and incident to the first photodetector when the optical pickup reproduces a recorded signal from the first recording layer;

third means for obtaining a reference address in the first recording layer, the reference address corresponding to a position radially coincident with a position at the prescribed address in the second recording layer;

fourth means for calculating an allowable error limit address in the first recording layer from the reference address, the allowable error limit address corresponding to a position radially separated from the position at the reference address by a distance determined by an allowable error range;

fifth means for detecting that the address detected by the second means reaches the allowable error limit address when the optical pickup reproduces a recorded signal from the first recording layer;

sixth means for deciding whether or not the level detected by the first means is substantially equal to a reference level when the fifth means detects that the address detected by the second means reaches the allowable error limit address, the reference level being equal to a detected level obtained by the first means when the sub photodetector receives reflected light caused by reflection of the main laser beam at the signal recorded area in the second recording layer; and seventh means for concluding that a misalignment between the tracks on the first and second recording layers is within the allowable error range in cases where the sixth means decides that the level detected by the first means is substantially equal to the reference level.

2. An apparatus as recited in claim 1, wherein the second recording layer is closer to the optical pickup than the first recording layer is when the optical pickup reproduces a recorded signal from the first recording layer, and the first means comprises means for detecting a level of a signal generated by the second photodetector in response to flare caused by reflection of the main laser beam at the second recording layer and incident to the second photodetector.

3. An apparatus as recited in claim 1, wherein the first recording layer is closer to the optical pickup than the second recording layer is when the optical pickup reproduces a recorded signal from the first recording layer, and the first means comprises means for detecting a level of a signal generated by the second photodetector in response to flare caused by reflection of the main laser beam at the second recording layer and incident to the second photodetector.

4. An apparatus as recited in claim 1, wherein the first means comprises means for detecting one of (1) a peak level and (2) a mean level of a signal generated by the second photodetector.

5. A method of inspecting an optical disc having multiple recording layers including first and second recording layers adjacent to each other, the second recording layer having a signal recorded area and a signal unrecorded area, wherein a boundary between the signal recorded area and the signal unrecorded area is at a prescribed address on a track on the second recording layer, the method comprising the steps of:

applying a main laser beam to the optical disc, focusing the main laser beam on the first recording layer, receiving reflected light caused by reflection of the main laser beam at the first recording layer, and converting the received reflected light into a main electric signal to reproduce a recorded signal from the first recording layer;

receiving reflected light caused by reflection of the main laser beam at the second recording layer, and converting the received reflected light into a sub electric signal;

detecting a level of the sub electric signal;

detecting an address of a currently-accessed position in a track on the first recording layer from the main electric signal;

obtaining a reference address in the first recording layer, the reference address corresponding to a position radially coincident with a position at the prescribed address in the second recording layer;

calculating an allowable error limit address in the first recording layer from the reference address, the allowable error limit address corresponding to a position radially separated from the position at the reference address by a distance determined by an allowable error range;

detecting that the detected address reaches the allowable error limit address when a recorded signal is reproduced from the first recording layer;

deciding whether or not the detected level is substantially equal to a reference level when the detected address reaches the allowable error limit address, the reference level being equal to a detected level obtained in response to reflected light caused by reflection of the main laser beam at the signal recorded area in the second recording layer; and concluding that a misalignment between the tracks on the first and second recording layers is within the allowable error range in cases where the detected level is substantially equal to the reference level when the detected address reaches the allowable error limit address.

6. A method as recited in claim 5, wherein the second recording layer is closer to an optical disc surface to which the main laser beam is incident than the first recording layer is, and the level detecting step comprises detecting a level of the sub electric signal generated in response to flare caused by reflection of the main laser beam at the second recording layer.

7. A method as recited in claim 5, wherein the first recording layer is closer to an optical disc surface to which the main laser beam is incident than the second recording layer is, and the level detecting step comprises detecting a level of the sub electric signal generated in response to flare caused by reflection of the main laser beam at the second recording layer.

8. A method as recited in claim 5, wherein the level detecting step comprises detecting one of (1) a peak level and (2) a mean level of the sub electric signal.

9. An apparatus for inspecting an optical disc having multiple recording layers including first and second recording layers adjacent to each other, the second recording layer having a signal recorded area and first and second signal unrecorded areas, the signal recorded area extending between the first and second signal unrecorded areas, wherein a boundary between the signal recorded area and the first signal unrecorded area is at a prescribed recording start address on a track on the second recording layer, and a boundary between the signal recorded area and the second signal unrecorded area is at a prescribed recording end address on the track on the second recording layer, the apparatus comprising:

an optical pickup for applying a main laser beam to the optical disc, for focusing the main laser beam on one of the multiple recording layers, and for receiving reflected light caused by reflection of the main laser beam at the one of the multiple recording layers to reproduce a recorded signal from the one of the multiple recording layers;

a first photodetector provided in the optical pickup for receiving a main reflected beam caused by reflection of the main laser beam at the one of the multiple recording layers;

a second photodetector provided in the optical pickup and separated from the first photodetector;

first means for detecting a level of a signal generated by the second photodetector in response to reflected light caused by reflection of the main laser beam at the second recording layer and incident to the second photodetector when the optical pickup reproduces a recorded signal from the first recording layer;

second means for detecting an address of a currently-accessed position in a track on the first recording layer from a signal generated by the first photodetector in response to reflected light caused by reflection of the main laser beam at the first recording layer and incident to the first photodetector when the optical pickup reproduces a recorded signal from the first recording layer;

third means for obtaining first and second reference addresses in the first recording layer, the first reference address corresponding to a position radially coincident with a position at the prescribed recording start address in the second recording layer, the second reference address corresponding to a position radially coincident with a position at the prescribed recording end address in the second recording layer;

fourth means for calculating first and second allowable error limit addresses in the first recording layer from the first and second reference addresses, the first allowable error limit address corresponding to a position radially separated from the position at the first reference address by a distance determined by an allowable error range, the second allowable error limit address corresponding to a position radially separated from the position at the second reference address by a distance determined by the allowable error range;

fifth means for detecting that the address detected by the second means reaches the first allowable error limit address when the optical pickup reproduces a recorded signal from the first recording layer, and for detecting that the address detected by the second means reaches the second allowable error limit address when the optical pickup reproduces a recorded signal from the first recording layer;

sixth means for deciding whether or not the level detected by the first means is substantially equal to a reference level when the fifth means detects that the address detected by the second means reaches the first allowable error limit address, and for deciding whether or not the level detected by the first means is substantially equal to the reference level when the fifth means detects that the address detected by the second means reaches the second allowable error limit address, the reference level being equal to a detected level obtained by the first means when the sub photodetector receives reflected light caused by reflection of the main laser beam at the signal recorded area in the second recording layer; and seventh means for concluding that a misalignment between the tracks on the first and second recording layers is within the allowable error range in cases where the sixth means decides that the level detected by the first means is substantially equal to the reference level when the fifth means detects that the address detected by the second means reaches the first allowable error limit address, and decides that the level detected by the first means is substantially equal to the reference level when the fifth means detects that the address detected by the second means reaches the second allowable error limit address.

10. An apparatus as recited in claim 9, wherein the second recording layer is closer to the optical pickup than the first recording layer is when the optical pickup reproduces a recorded signal from the first recording layer, and the first means comprises means for detecting a level of a signal generated by the second photodetector in response to flare caused by reflection of the main laser beam at the second recording layer and incident to the second photodetector.

11. An apparatus as recited in claim 9, wherein the first recording layer is closer to the optical pickup than the second recording layer is when the optical pickup reproduces a recorded signal from the first recording layer, and the first means comprises means for detecting a level of a signal generated by the second photodetector in response to flare caused by reflection of the main laser beam at the second recording layer and incident to the second photodetector.

12. An apparatus as recited in claim 9, wherein the first means comprises means for detecting one of (1) a peak level and (2) a mean level of a signal generated by the second photodetector.

13. A method of inspecting an optical disc having multiple recording layers including first and second recording layers adjacent to each other, the second recording layer having a signal recorded area and first and second signal unrecorded areas, the signal recorded area extending between the first and second signal unrecorded areas, wherein a boundary between the signal recorded area and the first signal unrecorded area is at a prescribed recording start address on a track on the second recording layer, and a boundary between the signal recorded area and the second signal unrecorded area is at a prescribed recording end address on the track on the second recording layer, the method comprising the steps of:

applying a main laser beam to the optical disc, focusing the main laser beam on the first recording layer, receiving reflected light caused by reflection of the main laser beam at the first recording layer, and converting the received reflected light into a main electric signal to reproduce a recorded signal from the first recording layer;

receiving reflected light caused by reflection of the main laser beam at the second recording layer, and converting the received reflected light into a sub electric signal;

detecting a level of the sub electric signal;

detecting an address of a currently-accessed position in a track on the first recording layer from the main electric signal;

obtaining first and second reference addresses in the first recording layer, the first reference address corresponding to a position radially coincident with a position at the prescribed recording start address in the second recording layer, the second reference address corresponding to a position radially coincident with a position at the prescribed recording end address in the second recording layer;

calculating first and second allowable error limit addresses in the first recording layer from the first and second reference addresses, the first allowable error limit address corresponding to a position radially separated from the position at the first reference address by a distance determined by an allowable error range, the second allowable error limit address corresponding to a position radially separated from the position at the second reference address by a distance determined by the allowable error range;

detecting that the detected address reaches the first allowable error limit address when a recorded signal is reproduced from the first recording layer, and detecting that the detected address reaches the second allowable error limit address when a recorded signal is reproduced from the first recording layer;

deciding whether or not the detected level is substantially equal to a reference level when the detected address reaches the first allowable error limit address, and deciding whether or not the detected level is substantially equal to the reference level when the detected address reaches the second allowable error limit address, the reference level being equal to a detected level obtained in response to reflected light caused by reflection of the main laser beam at the signal recorded area in the second recording layer; and concluding that a misalignment between the tracks on the first and second recording layers is within the allowable error range in cases where the detected level is substantially equal to the reference level when the detected address reaches the first allowable error limit address, and the detected level is substantially equal to the reference level when the detected address reaches the second allowable error limit address.

14. A method as recited in claim 13, wherein the second recording layer is closer to an optical disc surface to which the main laser beam is incident than the first recording layer is, and the level detecting step comprises detecting a level of the sub electric signal generated in response to flare caused by reflection of the main laser beam at the second recording layer.

15. A method as recited in claim 13, wherein the first recording layer is closer to an optical disc surface to which the main laser beam is incident than the second recording layer is, and the level detecting step comprises detecting a level of the sub electric signal generated in response to flare caused by reflection of the main laser beam at the second recording layer.

16. A method as recited in claim 13, wherein the level detecting step comprises detecting one of (1) a peak level and (2) a mean level of the sub electric signal.

17. An apparatus for inspecting an optical disc having multiple recording layers including first and second recording layers adjacent to each other, the second recording layer having a signal recorded area and first and second signal unrecorded areas, the signal recorded area extending between the first and second signal unrecorded areas, wherein a boundary between the signal recorded area and the first signal unrecorded area is at a prescribed recording start address on a track on the second recording layer, and a boundary between the signal recorded area and the second signal unrecorded area is at a prescribed recording end address on the track on the second recording layer, the apparatus comprising:

an optical pickup for applying a main laser beam to the optical disc, for focusing the main laser beam on one of the multiple recording layers, and for receiving reflected light caused by reflection of the main laser beam at the one of the multiple recording layers to reproduce a recorded signal from the one of the multiple recording layers;

a first photodetector provided in the optical pickup for receiving a main reflected beam caused by reflection of the main laser beam at the one of the multiple recording layers;

a second photodetector provided in the optical pickup and separated from the first photodetector;

first means for detecting a level of a signal generated by the second photodetector in response to reflected light caused by reflection of the main laser beam at the second recording layer and incident to the second photodetector when the optical pickup reproduces a recorded signal from the first recording layer;

second means for detecting an address of a currently-accessed position in a track on the first recording layer from a signal generated by the first photodetector in response to reflected light caused by reflection of the main laser beam at the first recording layer and incident to the first photodetector when the optical pickup reproduces a recorded signal from the first recording layer;

third means for obtaining a reference address in the first recording layer, the reference address corresponding to a position radially coincident with a position at the prescribed recording start address in the second recording layer;

fourth means for calculating an allowable error limit address in the first recording layer from the reference address, the allowable error limit address corresponding to a position radially separated from the position at the reference address by a distance determined by an allowable error range;

fifth means for detecting that the address detected by the second means reaches the allowable error limit address when the optical pickup reproduces a recorded signal from the first recording layer;

sixth means for deciding whether or not the level detected by the first means is substantially equal to a reference level when the fifth means detects that the address detected by the second means reaches the allowable error limit address, the reference level being equal to a detected level obtained by the first means when the sub photodetector receives reflected light caused by reflection of the main laser beam at the signal recorded area in the second recording layer; and seventh means for concluding that a misalignment between the tracks on the first and second recording layers is within the allowable error range in cases where the sixth means decides that the level detected by the first means is substantially equal to the reference level when the fifth means detects that the address detected by the second means reaches the allowable error limit address.

18. An apparatus for inspecting an optical disc having multiple recording layers including first and second recording layers adjacent to each other, the second recording layer having a signal recorded area and first and second signal unrecorded areas, the signal recorded area extending between the first and second signal unrecorded areas, wherein a boundary between the signal recorded area and the first signal unrecorded area is at a prescribed recording start address on a track on the second recording layer, and a boundary between the signal recorded area and the second signal unrecorded area is at a prescribed recording end address on the track on the second recording layer, the apparatus comprising:

an optical pickup for applying a main laser beam to the optical disc, for focusing the main laser beam on one of the multiple recording layers, and for receiving reflected light caused by reflection of the main laser beam at the one of the multiple recording layers to reproduce a recorded signal from the one of the multiple recording layers;

a first photodetector provided in the optical pickup for receiving a main reflected beam caused by reflection of the main laser beam at the one of the multiple recording layers;

a second photodetector provided in the optical pickup and separated from the first photodetector;

first means for detecting a level of a signal generated by the second photodetector in response to reflected light caused by reflection of the main laser beam at the second recording layer and incident to the second photodetector when the optical pickup reproduces a recorded signal from the first recording layer;

second means for detecting an address of a currently-accessed position in a track on the first recording layer from a signal generated by the first photodetector in response to reflected light caused by reflection of the main laser beam at the first recording layer and incident to the first photodetector when the optical pickup reproduces a recorded signal from the first recording layer;

third means for obtaining a reference address in the first recording layer, the reference address corresponding to a position radially coincident with a position at the prescribed recording end address in the second recording layer;

fourth means for calculating an allowable error limit address in the first recording layer from the reference address, the allowable error limit address corresponding to a position radially separated from the position at the reference address by a distance determined by an allowable error range;

fifth means for detecting that the address detected by the second means reaches the allowable error limit address when the optical pickup reproduces a recorded signal from the first recording layer;

sixth means for deciding whether or not the level detected by the first means is substantially equal to a reference level when the fifth means detects that the address detected by the second means reaches the allowable error limit address, the reference level being equal to a detected level obtained by the first means when the sub photodetector receives reflected light caused by reflection of the main laser beam at the signal recorded area in the second recording layer; and seventh means for concluding that a misalignment between the tracks on the first and second recording layers is within the allowable error range in cases where the sixth means decides that the level detected by the first means is substantially equal to the reference level when the fifth means detects that the address detected by the second means reaches the allowable error limit address.

19. An apparatus as recited in claim 17, wherein the first means comprises means for detecting one of (1) a peak level and (2) a mean level of a signal generated by the second photodetector.

20. A method of inspecting an optical disc having multiple recording layers including first and second recording layers adjacent to each other, the second recording layer having a signal recorded area and first and second signal unrecorded areas, the signal recorded area extending between the first and second signal unrecorded areas, wherein a boundary between the signal recorded area and the first signal unrecorded area is at a prescribed recording start address on a track on the second recording layer, and a boundary between the signal recorded area and the second signal unrecorded area is at a prescribed recording end address on the track on the second recording layer, the method comprising the steps of:

applying a main laser beam to the optical disc, focusing the main laser beam on the first recording layer, receiving reflected light caused by reflection of the main laser beam at the first recording layer, and converting the received reflected light into a main electric signal to reproduce a recorded signal from the first recording layer;

receiving reflected light caused by reflection of the main laser beam at the second recording layer, and converting the received reflected light into a sub electric signal;

detecting a level of the sub electric signal;

detecting an address of a currently-accessed position in a track on the first recording layer from the main electric signal;

obtaining a reference address in the first recording layer, the reference address corresponding to a position radially coincident with a position at the prescribed recording start address in the second recording layer;

calculating an allowable error limit address in the first recording layer from the reference address, the allowable error limit address corresponding to a position radially separated from the position at the reference address by a distance determined by an allowable error range;

detecting that the detected address reaches the allowable error limit address when a recorded signal is reproduced from the first recording layer;

deciding whether or not the detected level is substantially equal to a reference level when the detected address reaches the allowable error limit address, the reference level being equal to a detected level obtained in response to reflected light caused by reflection of the main laser beam at the signal recorded area in the second recording layer; and concluding that a misalignment between the tracks on the first and second recording layers is within the allowable error range in cases where the detected level is substantially equal to the reference level when the detected address reaches the allowable error limit address.

21. A method of inspecting an optical disc having multiple recording layers including first and second recording layers adjacent to each other, the second recording layer having a signal recorded area and first and second signal unrecorded areas, the signal recorded area extending between the first and second signal unrecorded areas, wherein a boundary between the signal recorded area and the first signal unrecorded area is at a prescribed recording start address on a track on the second recording layer, and a boundary between the signal recorded area and the second signal unrecorded area is at a prescribed recording end address on the track on the second recording layer, the method comprising the steps of:

applying a main laser beam to the optical disc, focusing the main laser beam on the first recording layer, receiving reflected light caused by reflection of the main laser beam at the first recording layer, and converting the received reflected light into a main electric signal to reproduce a recorded signal from the first recording layer;

receiving reflected light caused by reflection of the main laser beam at the second recording layer, and converting the received reflected light into a sub electric signal;

detecting a level of the sub electric signal;

detecting an address of a currently-accessed position in a track on the first recording layer from the main electric signal;

obtaining a reference address in the first recording layer, the reference address corresponding to a position radially coincident with a position at the prescribed recording end address in the second recording layer;

calculating an allowable error limit address in the first recording layer from the reference address, the allowable error limit address corresponding to a position radially separated from the position at the reference address by a distance determined by an allowable error range;

detecting that the detected address reaches the allowable error limit address when a recorded signal is reproduced from the first recording layer;

deciding whether or not the detected level is substantially equal to a reference level when the detected address reaches the allowable error limit address, the reference level being equal to a detected level obtained in response to reflected light caused by reflection of the main laser beam at the signal recorded area in the second recording layer; and concluding that a misalignment between the tracks on the first and second recording layers is within the allowable error range in cases where the detected level is substantially equal to the reference level when the detected address reaches the allowable error limit address.

22. A method as recited in claim 20, wherein the level detecting step comprises detecting one of (1) a peak level and (2) a mean level of the sub electric signal.

* * * * *